(12) United States Patent
Kobayashi et al.

(10) Patent No.: US 7,215,894 B2
(45) Date of Patent: May 8, 2007

(54) OPTICAL TRANSMITTER DEVICE

(75) Inventors: Yuka Kobayashi, Kawasaki (JP); Tetsuya Kiyonaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/044,181

(22) Filed: Jan. 28, 2005

(65) Prior Publication Data

US 2006/0088322 A1    Apr. 27, 2006

(30) Foreign Application Priority Data

Oct. 21, 2004    (JP)    ............................. 2004-306387

(51) Int. Cl.
*H04B 10/12*    (2006.01)
(52) U.S. Cl. ...................................... 398/195; 398/192
(58) Field of Classification Search ......... 398/182–201
See application file for complete search history.

(56) References Cited

U.S. PATENT DOCUMENTS

| | | | |
|---|---|---|---|
| 5,170,274 A | | 12/1992 | Kuwata et al. |
| 5,521,749 A | * | 5/1996 | Kawashima ................ 359/325 |
| 6,501,774 B2 | | 12/2002 | Kuwahara et al. |
| 6,583,910 B1 | * | 6/2003 | Satoh .......................... 398/182 |

FOREIGN PATENT DOCUMENTS

EP    0 961 424    12/1999

OTHER PUBLICATIONS

Patent Abstracts of Japan, Publication No. 03-251815, Published Nov. 11, 1991.
Patent Abstracts of Japan, Publication No. 04-140712, Published May 14, 1992.
Patent Abstracts of Japan, Publication No. 09-061768, Published Mar. 7, 1997.
Patent Abstracts of Japan, Publication No. 11-340919, Published Dec. 10, 1999.

* cited by examiner

*Primary Examiner*—Agustin Bello
(74) *Attorney, Agent, or Firm*—Staas & Halsey LLP

(57) ABSTRACT

An optical transmitter device capable of high-speed shutdown of optical output. A bias controller generates a low-frequency signal, extracts the frequency component of a low-frequency signal from an electrical signal fed back thereto, and compares the phase of the frequency component of the low-frequency signal generated thereby with that of the frequency component of the extracted low-frequency signal, to generate a direct-current voltage with which the operating point of an optical modulator is optimized. Using a half-wave voltage of the optical modulator and an optimum voltage, a bottom voltage calculation unit calculates a bottom voltage corresponding to a minimum of the operation characteristic curve of the modulator. A voltage selection unit selects the direct-current voltage during normal operation, to apply the optical modulator with a bias voltage derived from the direct-current voltage, and selects the bottom voltage at the time of shutdown, to apply the bottom voltage to the modulator.

7 Claims, 20 Drawing Sheets ately optical transmitter device, and more particularly, to an optical transmitter device for controlling transmission of an optical signal.

OPTICAL TRANSMITTER DEVICE

CROSS-REFERENCE TO RELATED APPLICATIONS

This application is based upon and claims the benefits of priority from the prior Japanese Patent Application No. 2004-306387 filed on Oct. 21, 2004, the entire contents of which are incorporated herein by reference.

BACKGROUND OF THE INVENTION

1. Field of the Invention

The present invention relates to optical transmitter devices, and more particularly, to an optical transmitter device for controlling transmission of an optical signal.

2. Description of the Related Art

With the advance of multimedia, the development of optical communication networks is being furthered to realize high-speed, low-cost transmission of enormous amounts of information over long distances. One of the devices indispensable to such optical communication networks is optical modulator.

Optical modulators are roughly classified into the type which uses an external voltage to modulate optical intensity (corresponding to amplitude modulation of radio wave) and the type which uses an external voltage to modulate optical phase. In optical fiber communications, the intensity modulation type is most commonly used.

FIG. 19 shows the configuration of an optical modulator. The optical modulator 100 is an intensity modulator wherein a Mach-Zehnder (MZ) interferometer (optical interferometer so configured as to split input light into two beams and subsequently reunite the two beams), which is constituted by an optical waveguide 101, is formed on a crystal substrate of lithium niobate (LiNbO$_3$: hereinafter "LN") or the like having an electrooptic effect (change of the refractive index induced by application of an electric field).

The optical waveguide 101 diverges into two parallel waveguides 101a and 101b. As shown in FIG. 19, a signal electrode 102 is formed near the parallel waveguide 101a, and a ground electrode 103 is formed on both sides of the signal electrode 102 (FIG. 19 shows a Z-cut substrate with a single electrode structure).

Also, the signal electrode 102 is connected with a resistor R at the illustrated position and thus terminated. A predetermined voltage is applied to the signal electrode 102 so that the signal electrode 102 may act as a traveling-wave electrode which causes electrical and optical signals to travel in the same direction.

Due to the electric field (voltage) applied at this time to the optical waveguide 101, the refractive indexes of the parallel waveguides 101a and 101b change by +Δn and −Δn, respectively. As a result, the phase difference between the parallel waveguides 101a and 101b changes, and thus an intensity-modulated optical signal is output from the output waveguide (the intensity of the optical signal increases if the phase difference between the parallel waveguides 101a and 101b is 0° and decreases if the phase difference is π).

Thus, in the LN modulator having an optical waveguide formed on the LN crystal having an electrooptic effect, the refractive index of one optical path (optical path length) is changed to vary the interference state, thereby switching the optical signal ON and OFF. Also, the electrooptic effect takes place in a very short response time and permits high-speed modulation (e.g., at 10 Gb/s or higher).

FIG. 20 shows the configuration of a conventional optical transmitter device including the optical modulator 100. The optical transmitter device 110 comprises the optical modulator 100, a PD (Photo Diode) 111, an operation controller 112, and a bias T circuit 113.

The signal electrode 102 of the optical modulator 100 is input at one end thereof with an input data signal ("0", "1") via a capacitor C. The other end of the signal electrode 102 is connected to the bias T circuit 113 and a terminating resistor R, and applied via the bias T circuit 113 with a bias voltage generated by the operation controller 112.

The operation controller 112 has a low-frequency oscillator therein and superimposes a low-frequency signal generated by the oscillator on the bias voltage. Thus, the optical modulator 100 is driven by a signal which is derived by superimposing the low-frequency signal on the input data signal, to output an intensity-modulated optical signal.

The operating point for the optical modulation of the optical modulator 100 varies (drifts) depending on temperature or with time. To cope with such variation, the optical signal output from the optical modulator 100 is split by a coupler and converted to an electrical signal 111a by the PD 111, and based on the result of detection of the low-frequency signal contained in the electrical signal 111a, the operation controller 112 controls the bias voltage to an optimum value.

If the frequency component of pilot signal appears in the electrical signal 111a, then it means that the bias voltage is deviated from an optimum operating point, and if the frequency component of the pilot signal does not appear in the electrical signal 111a, it means that the bias voltage is optimized. Feedback control is carried out in this manner, thereby controlling the optical modulator 100 so as to always operate at a constant operating point.

As techniques applied to conventional optical transmitter devices including an optical modulator, there has been proposed a technique of cutting off the optical signal output from the optical modulator when a power alarm or a wavelength alarm is received (e.g., Unexamined Japanese Patent Publication No. H11-340919 (paragraph nos. [0036] to [0044], FIG. 5)).

In optical fiber communication systems, shutdown control for automatically stopping a high-level optical output (called "APSD (Auto Power Shut Down)") is performed in order to protect the human body or prevent a fire in case an optical fiber connector comes off or an optical fiber becomes disconnected, or at the time of line switching of the system.

In the case of carrying out the shutdown in the aforementioned optical transmitter device 110, the operating point of the optical modulator 100 is changed in response to a shutdown instruction from the host side, to lower the optical output level.

According to the conventional shutdown control, however, a long time is required after the operation controller 112 receives a shutdown instruction until the optical output of the optical modulator 100 actually drops, with the result that the shutdown cannot be performed at high speed.

In the operation controller 112, the electrical signal is filtered to extract the low-frequency signal, and a phase comparator compares the phase of the extracted low-frequency signal with that of the low-frequency signal generated by the low-frequency oscillator. The phase comparator outputs the derived phase difference component as a pulse-like phase difference signal, and a loop filter smoothes the phase difference signal (turns the signal into direct current) and amplifies the resultant signal, thereby generating the bias voltage.

On receiving a shutdown instruction, the operation controller 112 controls the internal elements to output a bottom voltage necessary for lowering the optical output level of the optical modulator. However, the aforementioned loop control requires a certain period of time for the loop, and in addition, the loop filter has a certain time constant necessary to stabilize the loop control (the response is delayed for a time period corresponding to the set time constant). Consequently, the currently output voltage cannot be switched at high speed to the bottom voltage after the reception of a shutdown instruction, making it impossible to instantly complete the shutdown.

In recent years, optical fiber communication technologies enabling high-speed, large-capacity optical communication of the order of 10 Gb/s or even 40 Gb/s, for example, are developed, necessitating correspondingly high-speed line switching. Accordingly, there is a strong demand for techniques that enable the optical transmitter device itself to shut down at high speed.

According to the aforementioned conventional technique (Unexamined Japanese Patent Publication No. H11-340919), the optical output from the optical modulator is simply stopped on reception of an alarm, which is the condition for stopping the optical output, and no consideration is given to high-speed shutdown control.

SUMMARY OF THE INVENTION

The present invention was created in view of the above circumstances, and an object thereof is to provide an optical transmitter device capable of high-speed shutdown.

To achieve the object, there is provided an optical transmitter device comprising a light source, a driver circuit for generating a driving voltage corresponding to an input signal, an optical modulator for modulating output light from the light source in accordance with the driving voltage and outputting the modulated light as an optical signal, an operating point stabilizing circuit for detecting drift of an operation characteristic curve of the optical modulator and controlling a bias voltage applied to the optical modulator such that an operating point of the optical modulator is situated at a fixed position with respect to the operation characteristic curve, and a bottom voltage calculation unit for calculating a bottom voltage of the operation characteristic curve from a half-wave voltage of the operation characteristic curve and the bias voltage, wherein the output of the optical modulator is restrained in accordance with an output from the bottom voltage calculation unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
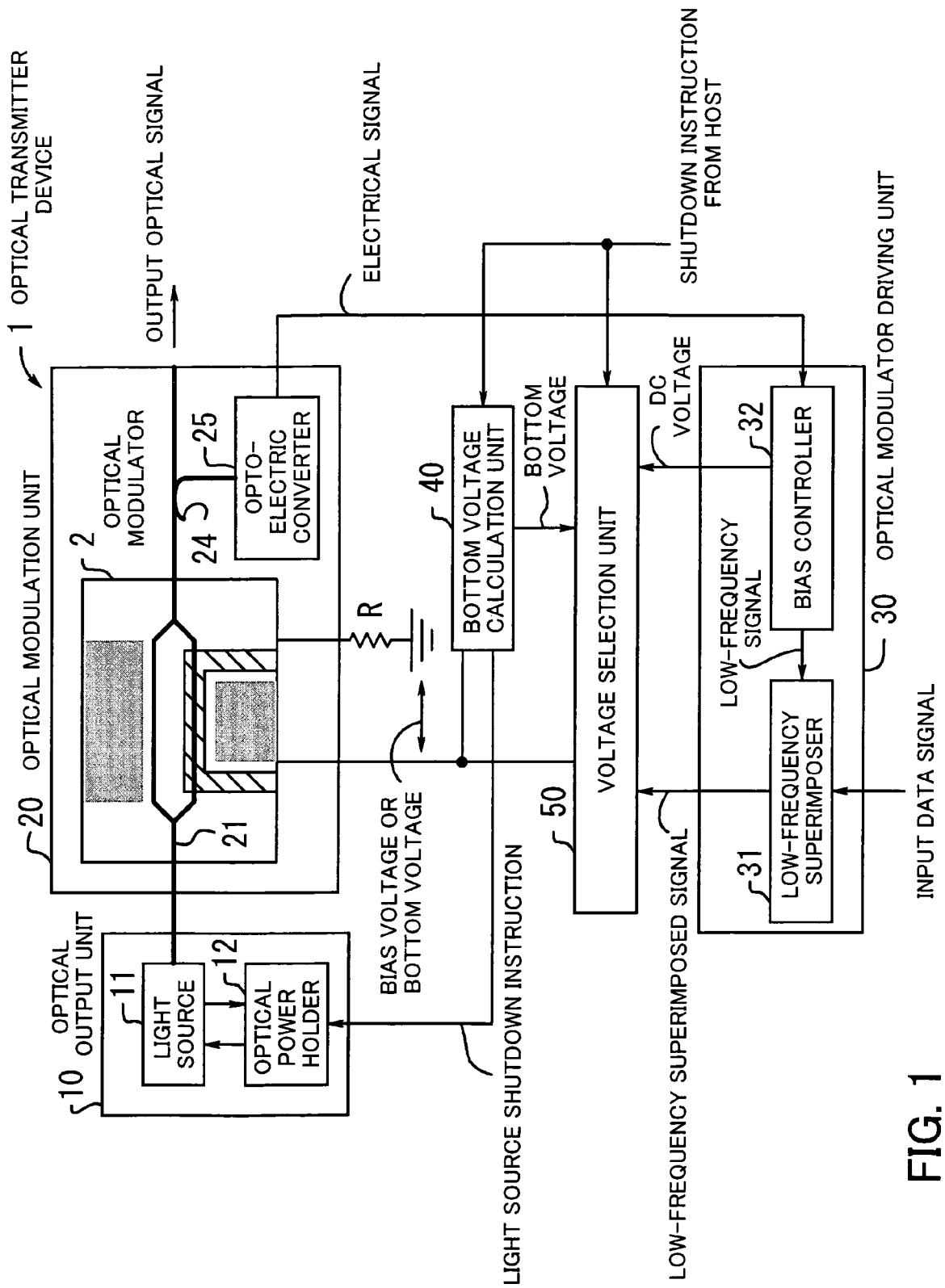
FIG. 1 illustrates the principle of an optical transmitter device.

Preferred embodiments of the present invention will be described below with reference to the accompanying drawings, wherein like reference numerals refer to like elements throughout. FIG. 1 illustrates the principle of an optical transmitter device. The optical transmitter device 1 comprises an optical output unit 10, an optical modulation unit 20, an optical modulator driving unit 30, a bottom voltage calculation unit 40 and a voltage selection unit 50, and controls transmission of an optical signal. The optical modulator driving unit 30 and the voltage selection unit 50 function as a driver circuit and an operating point stabilizing circuit of the present invention.

The optical output unit 10 includes a light source (hereinafter referred to as "LD (Laser Diode)") 11 and an optical power holder 12. The optical power holder 12 monitors the power of backward light of the LD 11 and controls a driving current supplied to the LD 11 such that the optical power output from the LD 11 is kept constant. In the following, the optical power holder 12 is referred to as "APC (Auto Power Controller) 12".

The optical modulation unit 20 includes an optical modulator (hereinafter "MZ modulator") 2, a coupler 24, and an opto-electric converter (hereinafter "PD") 25 (in FIG. 1, grounding of the ground electrode is not illustrated). The MZ modulator 2 modulates the intensity of the output light in accordance with an electric field applied to an optical waveguide 21 thereof formed on a crystal substrate having an electrooptic effect. The coupler 24 splits an optical signal output from the MZ modulator 2, and the PD 25 converts the split optical signal to an electrical signal.

The optical modulator driving unit 30 includes a low-frequency superimposer 31 and a bias controller 32. The low-frequency superimposer 31 superimposes a low-frequency signal on an input data signal by modulating the amplitude of the low-frequency signal, to generate a low-frequency superimposed signal.

The bias controller 32 generates a low-frequency signal and also extracts a frequency component from the low-frequency signal contained in the electrical signal fed back thereto. Then, the bias controller 32 compares the phase of the frequency component of the generated low-frequency signal with that of the frequency component of the extracted low-frequency signal and controls a direct-current (DC) voltage applied to the MZ modulator 2 to an optimum voltage such that the operating point of the MZ modulator 2 is optimized. In the following, the bias controller 32 is referred to as "ABC (Auto Bias Controller) 32".

The bottom voltage calculation unit 40 calculates, from a half-wave voltage and optimum voltage of the MZ modulator 2, a bottom voltage which is a minimum value of the operation characteristic curve of the MZ modulator 2. During normal operation of the device, the voltage selection unit 50 selects the direct-current voltage generated by the ABC 32, to apply the MZ modulator 2 with a bias voltage derived by adding the direct-current voltage to the low-frequency superimposed signal. At the time of shutdown, the voltage selection unit 50 selects the bottom voltage to apply the MZ modulator 2 with the bottom voltage. In the following, the low-frequency signal from the ABC 32 and the low-frequency superimposed signal are referred to respectively as "pilot signal" and "pilot superimposed signal".

Figure 2:
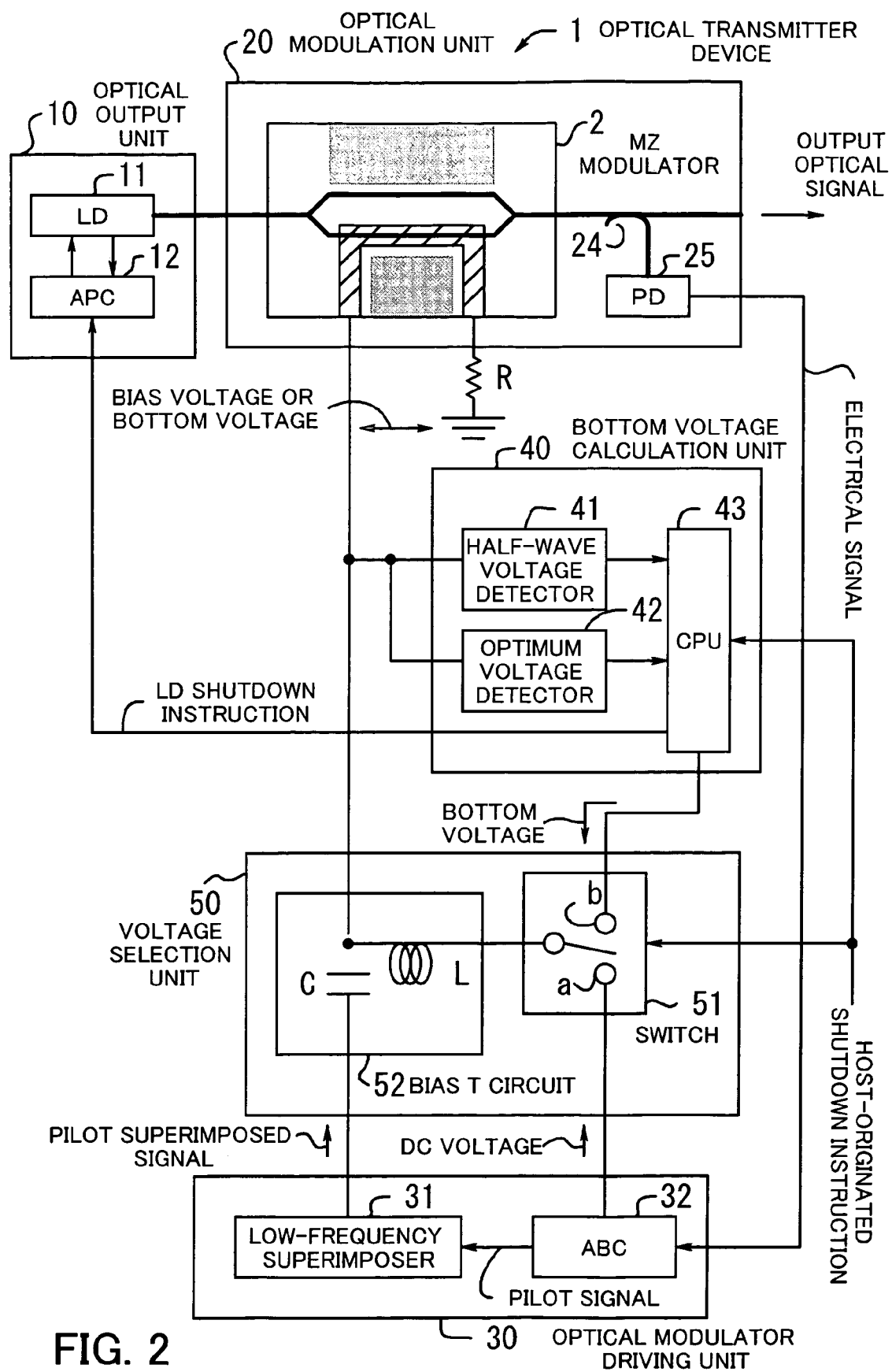
FIG. 2 shows the configuration of the optical transmitter device.

The configuration of the optical transmitter device 1 will be now described. Referring now to FIG. 2 showing the configuration of the optical transmitter device 1, the internal arrangements of the bottom voltage calculation unit 40 and voltage selection unit 50 will be explained (the internal arrangements of the other units are identical with those shown in FIG. 1).

The bottom voltage calculation unit 40 includes a half-wave voltage detector 41, an optimum voltage detector 42, and a CPU 43. The half-wave voltage detector 41 detects a half-wave voltage from the bias voltage applied to the MZ modulator 2 (the half-wave voltage will be explained later with reference to FIG. 5). The optimum voltage detector 42 detects an optimum voltage for the MZ modulator 2 from the bias voltage.

The CPU 43 calculates the bottom voltage from the half-wave voltage and optimum voltage detected during normal operation of the optical transmitter device 1. Also, on receiving a shutdown instruction from the host (host-originated shutdown instruction), the CPU 43 generates a shutdown instruction for the LD 11 (LD shutdown instruction) and sends the generated instruction to the APC 12.

The voltage selection unit 50 includes a switch 51 and a bias T circuit 52. The switch 51 has a switch terminal which is connected to a terminal a during normal operation and which is connected to a terminal b when the host-originated shutdown instruction is received.

The bias T circuit 52 includes a capacitor C and a coil L. The bias T circuit 52 adds the voltage selected by the switch 51 and applied via the coil L to the pilot superimposed signal from which the direct-current component has been removed by the capacitor C, and applies the resultant voltage to the MZ modulator 2 as the bias voltage or the bottom voltage.

Figure 3:
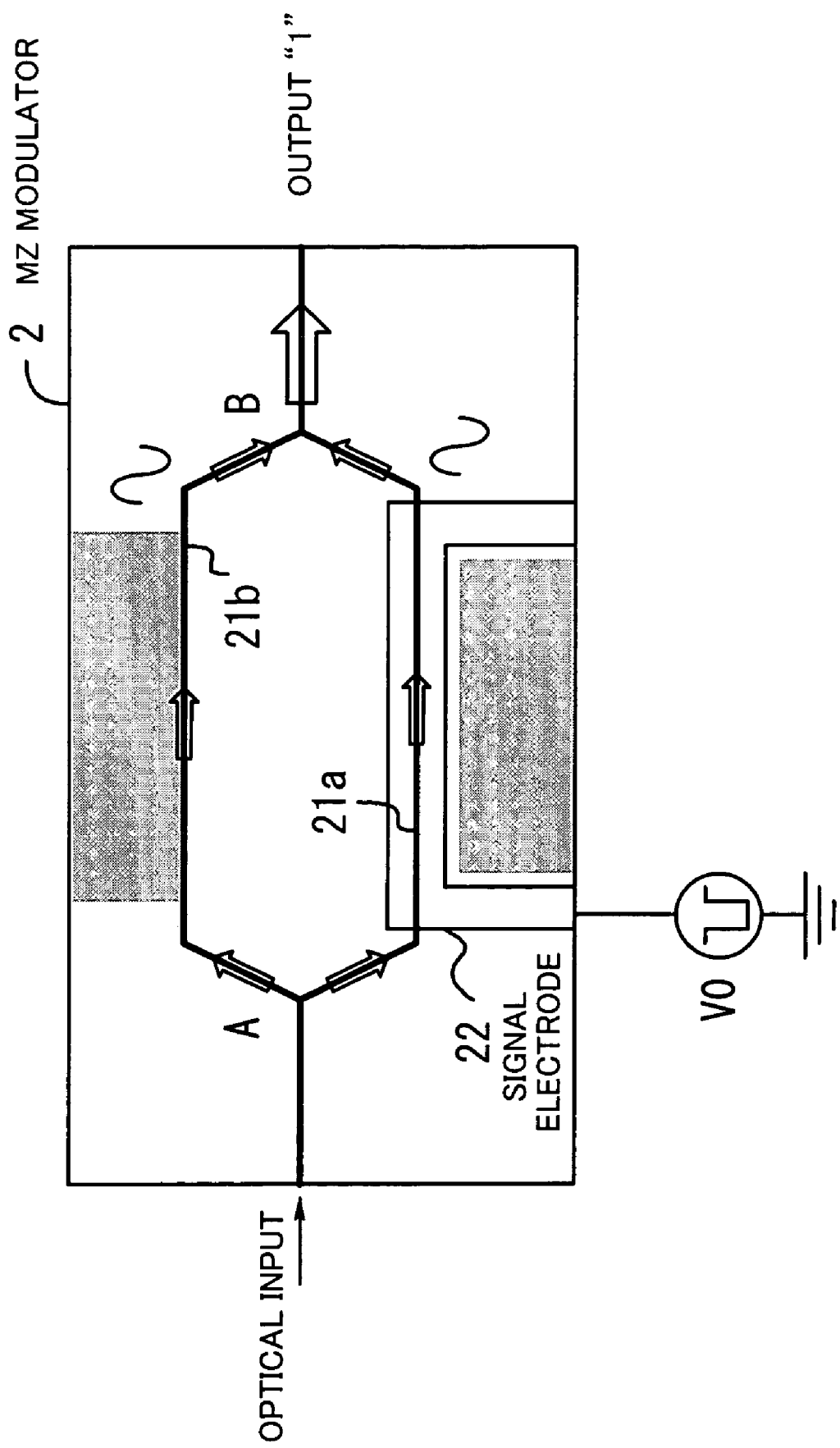
FIG. 3 illustrates the operation of an MZ modulator.
Figure 4:
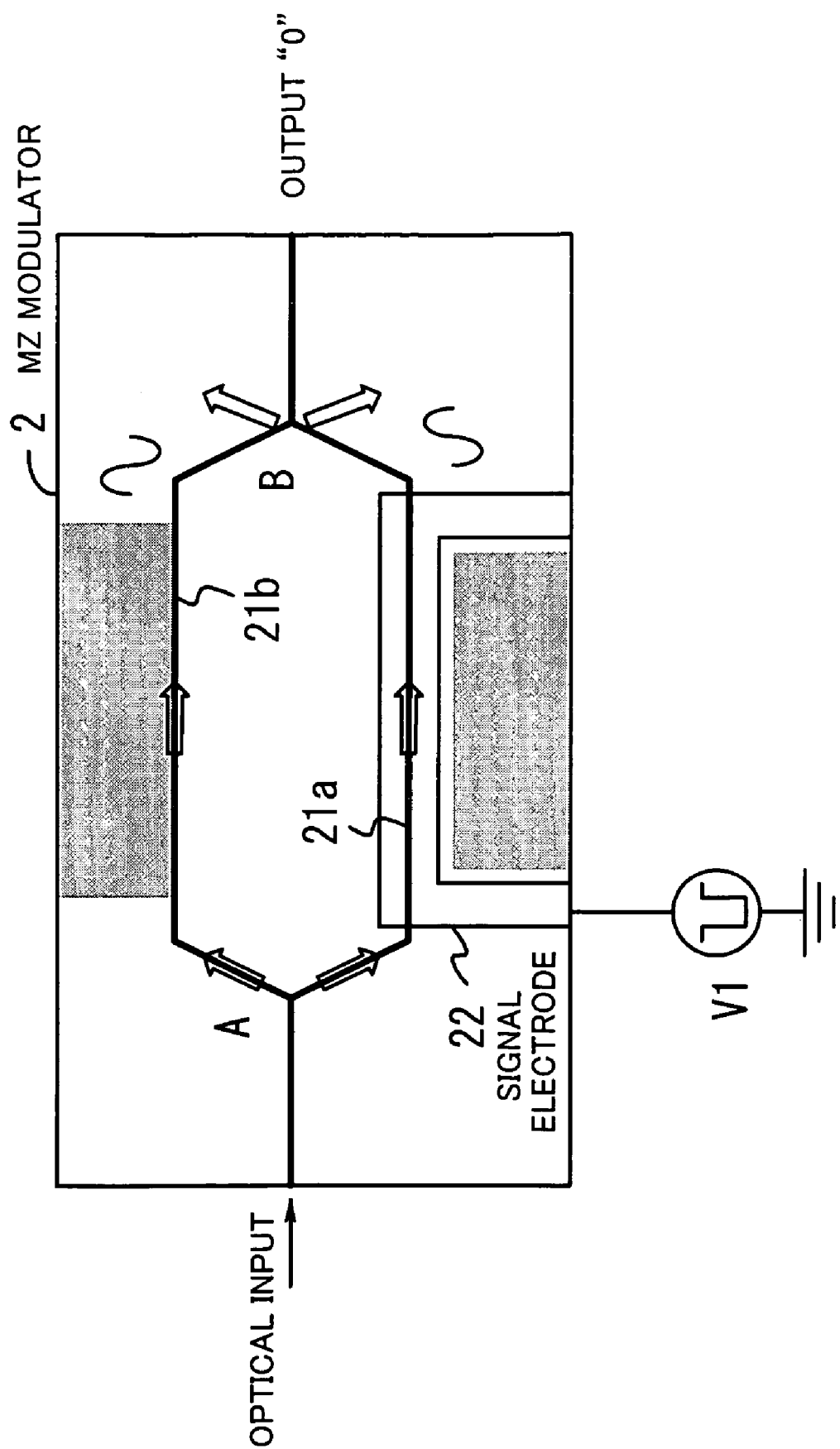
FIG. 4 also illustrates the operation of the MZ modulator.

Operation of the MZ modulator 2 and ABC control will be now described in detail. FIGS. 3 and 4 illustrate the operation of the MZ modulator 2. As shown in FIG. 3, when the applied voltage is at V0, the input light is split into two beams at a branch point A, and the two beams pass through respective parallel waveguides 21a and 21b and are reunited at a branch point B. In this case, no phase difference occurs in the parallel waveguides 21a and 21b, and accordingly, the two beams intensify each other, thus generating a signal output "1".

When the applied voltage is at V1 as shown in FIG. 4, the input light is similarly split into two beams at the branch point A and the two beams pass through the respective parallel waveguides 21a and 21b; however, the two beams have a phase difference π when reunited at the branch point B. Consequently, the waves of the two beams cancel out each other, thus providing a signal output "0" (the beams are diffused at the egress of the optical waveguide).

Accordingly, if an input signal "1010 . . . ", for example, is applied to the signal electrode 22, the electrode voltage changes as V0→V1→V1→V0→ . . . , generating an optical pulse "1010 . . . " (the rate of repetition of the optical pulse corresponds to a modulation rate which may be, for example, 10 Gb/s).

Figure 5:
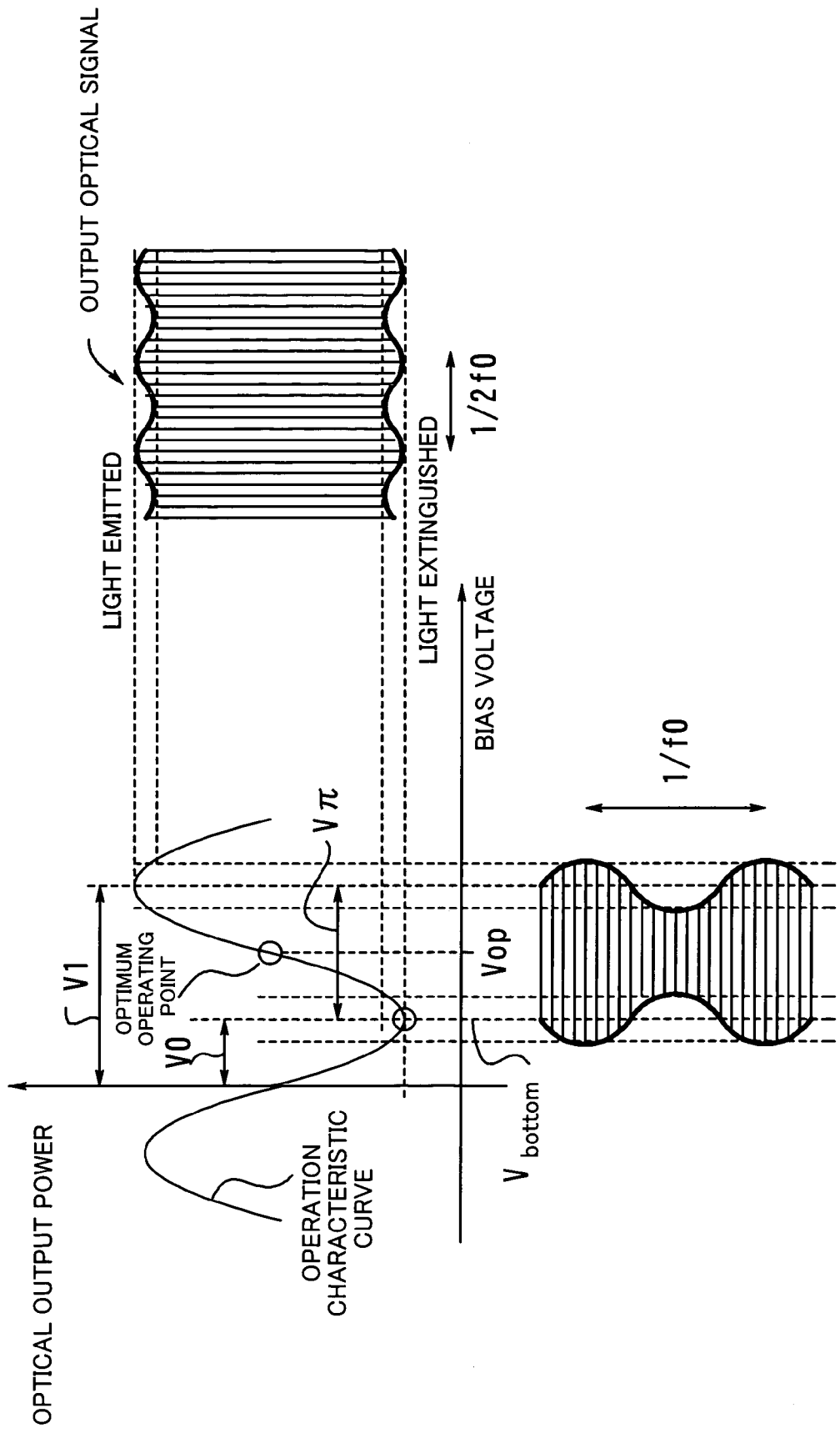
FIG. 5 shows a modulation characteristic of the MZ modulator.

FIG. 5 shows the modulation characteristic of the MZ modulator 2, wherein the vertical axis indicates the optical output power of the MZ modulator 2 and the horizontal axis indicates the bias voltage. In FIG. 5 are shown the waveforms of the operation characteristic curve, pilot superimposed signal and output optical signal of the MZ modulator 2.

The operation characteristic curve of the MZ modulator 2 is a function curve as a function of the cosine squared, and the middle point between the maximum and minimum values on the operation characteristic curve corresponds to the operating point of the MZ modulator 2. FIG. 5 shows the case where the MZ modulator 2 is operating optimally (the frequency component of the pilot signal does not appear in the electrical signal converted from the output optical signal). The bias voltage corresponding to the optimum operating point is indicated at Vop.

The operation of the MZ modulator 2 described above with reference to FIGS. 3 and 4 will be explained with reference to the coordinate system of FIG. 5. When the MZ modulator 2 is input with a pilot superimposed signal (amplitude-modulated signal obtained by superimposing the pilot signal on the input data signal) having a center thereof coinciding with the bias voltage Vop, an optical pulse whose intensity is modulated corresponding to "0" and "1" of the input data signal is output.

In this case, if the low-frequency pilot signal has a frequency f0, an optical signal whose intensity is modulated by a signal with a frequency 2f0 is output. In FIG. 5, Vπ represents the half-wave voltage (π denotes an amount of phase change necessary for switching light between "0" and "1", and the voltage required to cause the phase change is called the half-wave voltage). When the operating point is situated at the minimum value on the operation characteristic curve, the optical output of the MZ modulator 2 disappears, and the bias voltage applied at this time is the bottom voltage Vbottom.

Figure 6:
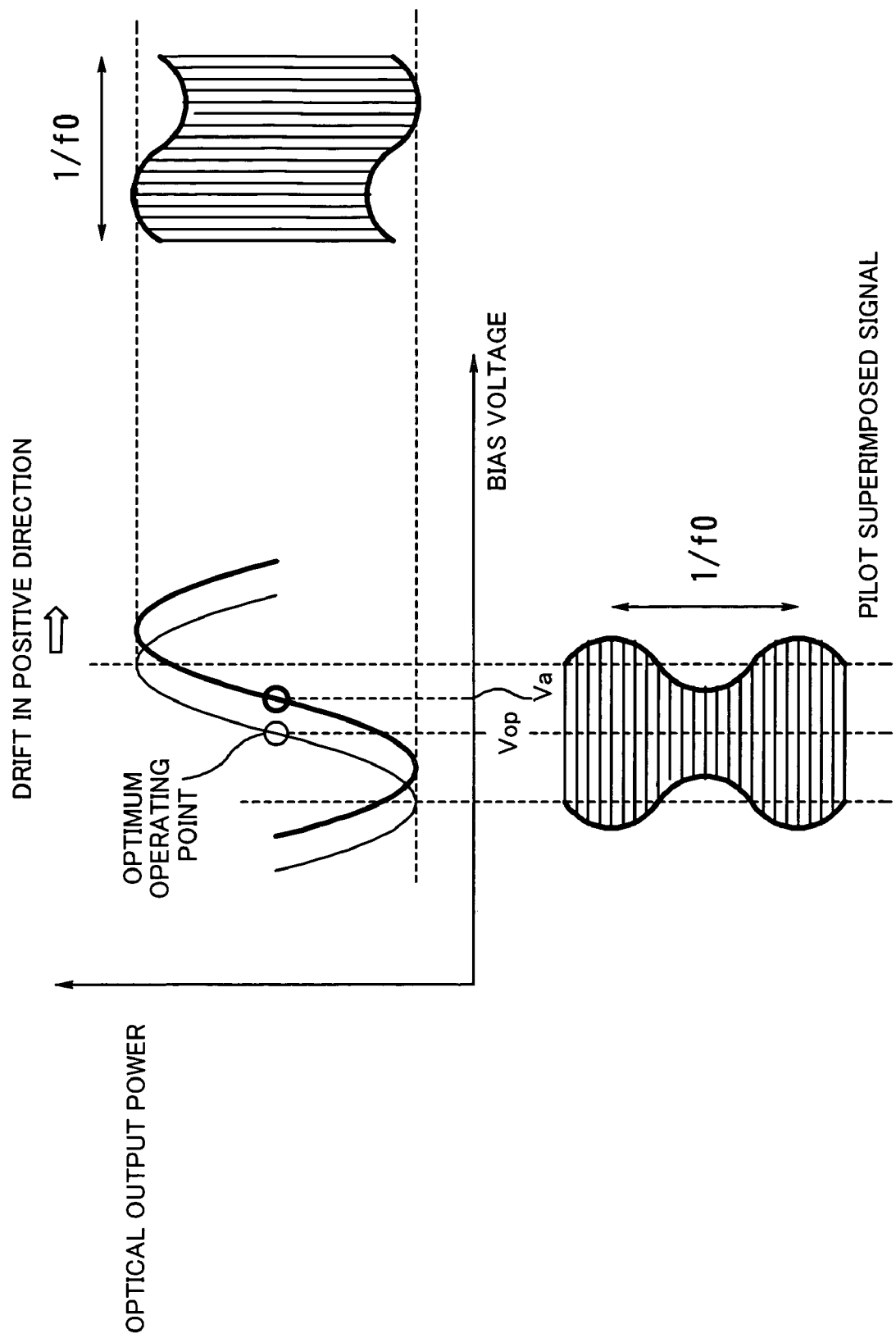
FIG. 6 shows a modulation characteristic observed when an operating point is deviated.
Figure 7:
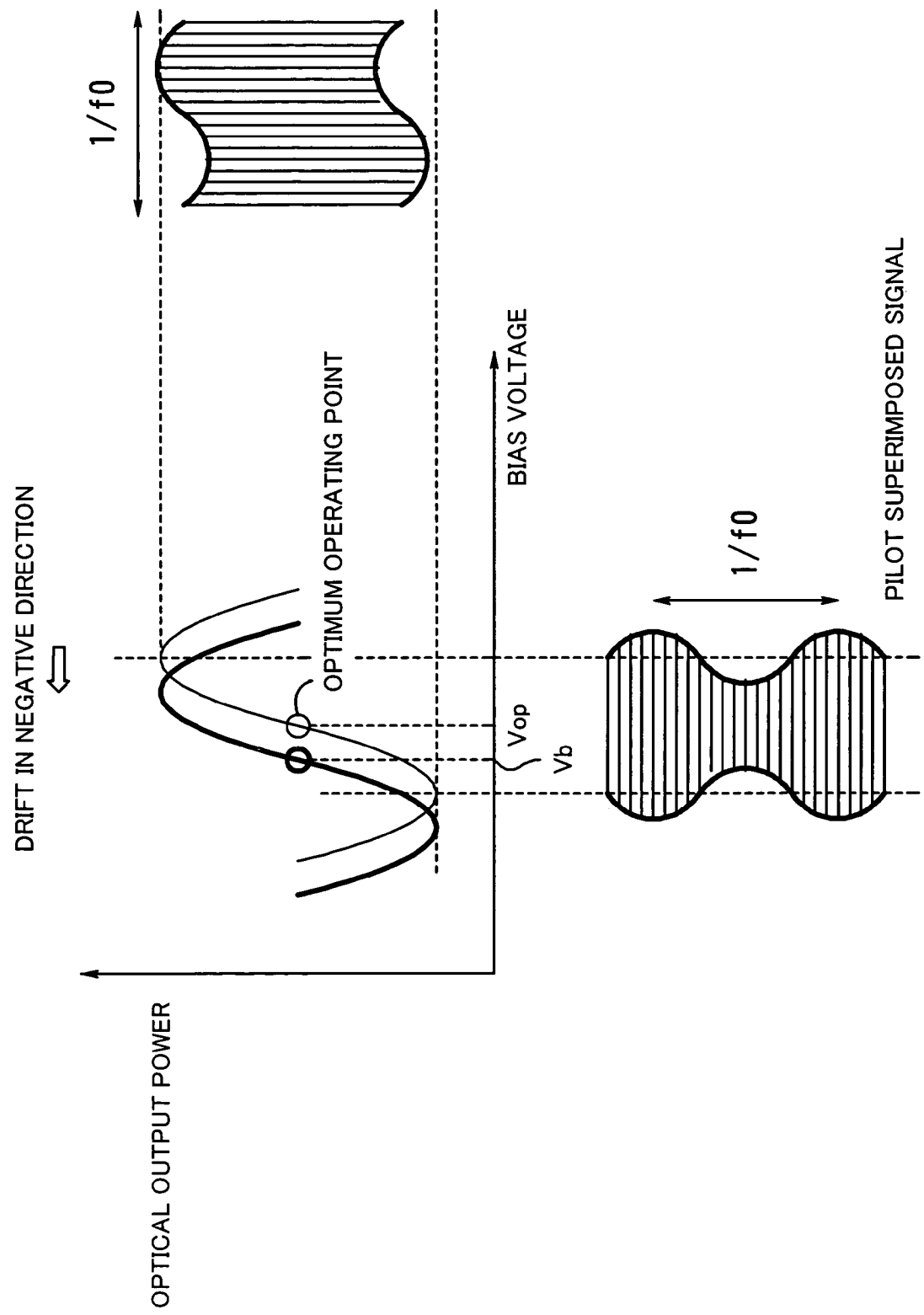
FIG. 7 also shows a modulation characteristic observed when the operating point is deviated.

FIGS. 6 and 7 each show a modulation characteristic observed when the operating point is deviated. Where the operating point of the MZ modulator 2 drifts due to change in temperature or with time, such drift can be depicted, in the coordinate system, as a shift of the operation characteristic curve with time along the horizontal axis. FIG. 6 shows a drift of the operating point in the positive direction, and FIG. 7 shows a drift of the operating point in the negative direction.

If the operating point drifts, the pilot signal (frequency: f0) is modulated in phase with the input data signal ("0", "1"), and because of the in-phase modulation, the output optical signal fluctuates with the frequency f0. The phase of the frequency f0 of the output optical signal shows a shift of π in either direction depending on the drifting direction of the operating point, as will be seen from the output optical signals shown in FIGS. 6 and 7.

The ABC control will be now described. The optical signal output from the MZ modulator 2 is converted to an electrical signal by the PD 25, and the electrical signal is input to the ABC 32. The ABC 32 detects the frequency component of the low-frequency pilot signal contained in the electrical signal by means of a filter incorporated therein, then compares the phase of the frequency component of the detected pilot signal with that of the frequency component of the pilot signal generated thereby, and controls the direct-current voltage to be output therefrom in accordance with the comparison result.

Referring to FIG. 6, the ABC control performed when the operating point drifts in the positive direction will be explained. When the operating point drifts in the positive direction (Vop<Va, where Va is the bias voltage applied during the positive drift), the envelopes of the pilot superimposed signal and output optical signal are in phase.

With regard to the pilot signal, the pilot signal generated by the ABC 32 itself is in phase with the pilot signal extracted from the electrical signal obtained by the opto-electric conversion. Thus, when such an in-phase state is detected as a result of the phase comparison, the ABC 32 lowers the bias voltage from the currently output voltage Va.

Referring now to FIG. 7, the ABC control performed when the operating point drifts in the negative direction will be explained. When the operating point drifts in the negative direction (Vb<Vop, where Vb is the bias voltage applied during the negative drift), the phase of the envelope of the pilot superimposed signal is opposite to that of the envelope of the output optical signal.

With regard to the pilot signal, the phase of the pilot signal generated by the ABC 32 itself is opposite to that of the pilot signal extracted from the electrical signal obtained by the opto-electric conversion. Thus, when such an opposite phase state is detected as a result of the phase comparison, the ABC 32 raises the bias voltage from the currently output voltage Vb.

In this manner, the ABC 32 compares the phase of the internally generated pilot signal with that of the pilot signal fed back thereto, to detect the relative position of the currently applied bias voltage relative to the optimum operating point, and controls the bias voltage to an optimum voltage. When the frequency component of the pilot signal does not appear in the electrical signal obtained by the opto-electric conversion, it can be concluded that the MZ modulator 2 is operating optimally.

Shutdown control will be now described. On receiving the host-originated shutdown instruction, the optical transmitter device 1 first changes the operating point of the MZ modulator 2 (lowers the bias voltage to the bottom voltage) to lower the optical output level, and then decreases the driving current supplied to the LD 11 to stop the emission of light from the LD 11.

It is known that if the emission of light from the LD 11 is stopped (the driving current is decreased), wavelength drift occurs, possibly exerting an adverse influence upon other channels during WDM transmission. When shutting down the optical transmitter device 1, therefore, the optical output level of the MZ modulator 2 is first lowered (MZ shutdown), and then the emission of light from the LD 11 is stopped (LD shutdown) to completely stop the optical output from the optical transmitter device 1, thereby lessening the influence of the wavelength drift.

Figure 8:
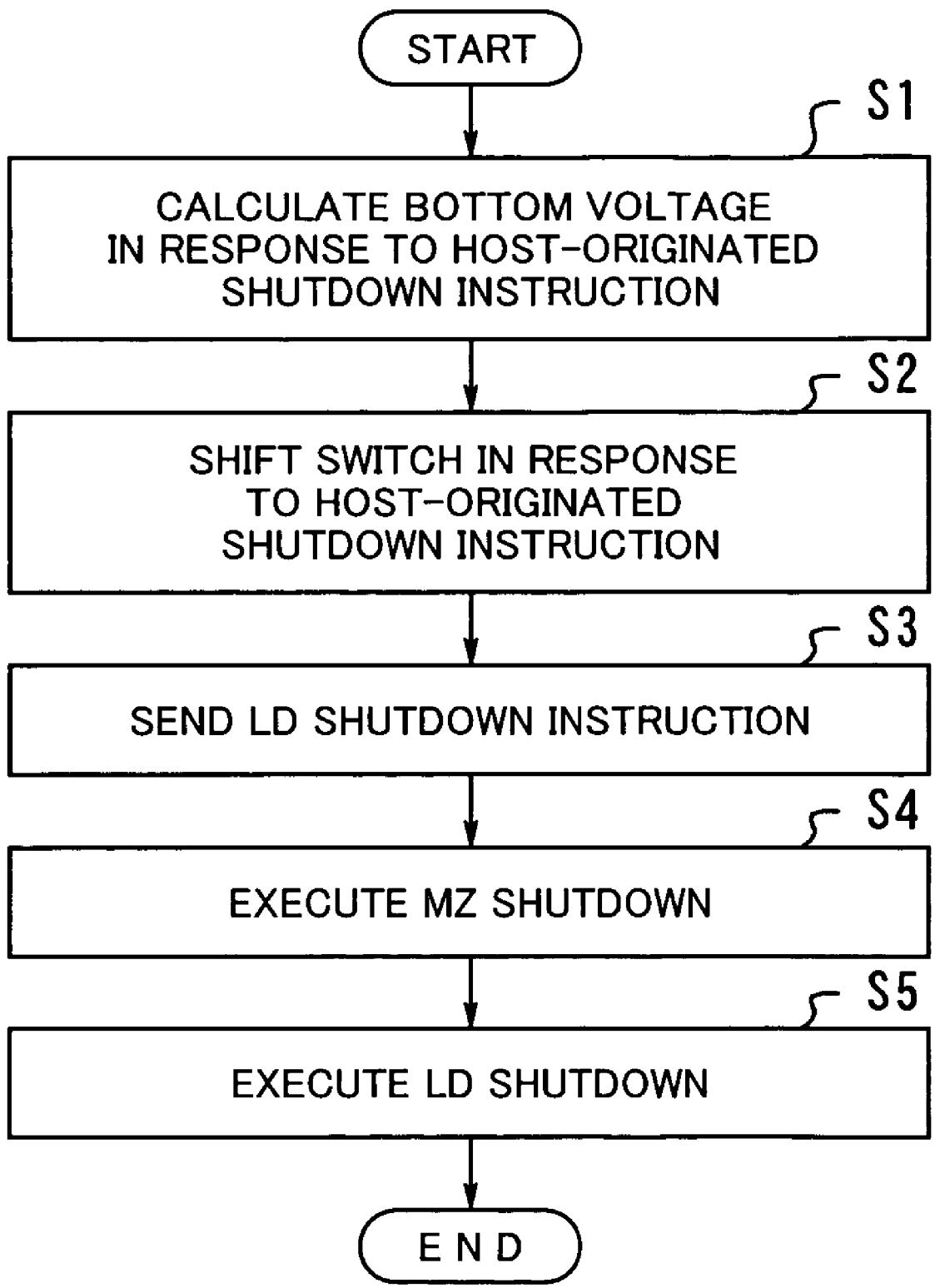
FIG. 8 is a flowchart illustrating an operation procedure for shutdown control.

FIG. 8 is a flowchart illustrating an operation procedure for the shutdown control.

[S1] On receiving a host-originated shutdown instruction, the CPU 43 fetches the half-wave voltage Vπ detected by the half-wave voltage detector 41 and the optimum voltage Vop detected by the optimum voltage detector 42, and calculates the bottom voltage.

[S2] On receiving the host-originated shutdown instruction, the switch 51 shifts its switch terminal from the terminal a to the terminal b.

[S3] The CPU 43 generates an LD shutdown instruction in response to the host-originated shutdown instruction, and sends the generated instruction to the APC 12 (the timing for sending the LD shutdown instruction is suitably set beforehand so that the LD shutdown will take place after the MZ shutdown).

[S4] The bottom voltage is applied to the MZ modulator 2 via the bias T circuit 52, to shut down the MZ modulator 2.

[S5] On receiving the LD shutdown instruction, the APC 12 decreases the driving current supplied to the LD 11, to shut down the LD 11.

The process of calculating the bottom voltage will be now described. Using the half-wave voltage Vπ and the optimum voltage Vop (the half-wave voltage Vπ and the optimum voltage Vop are subjected to analog-to-digital conversion in the CPU 43 to derive their respective digital values), the CPU 43 calculates the bottom voltage Vbottom according to the equation: Vbottom=Vop±Vπ/2. In the equation, "+" or "−" of the sign "±" is selected in accordance with the chirp characteristic (continuous change of optical frequency as a function of time) of the MZ modulator 2.

Figure 9:
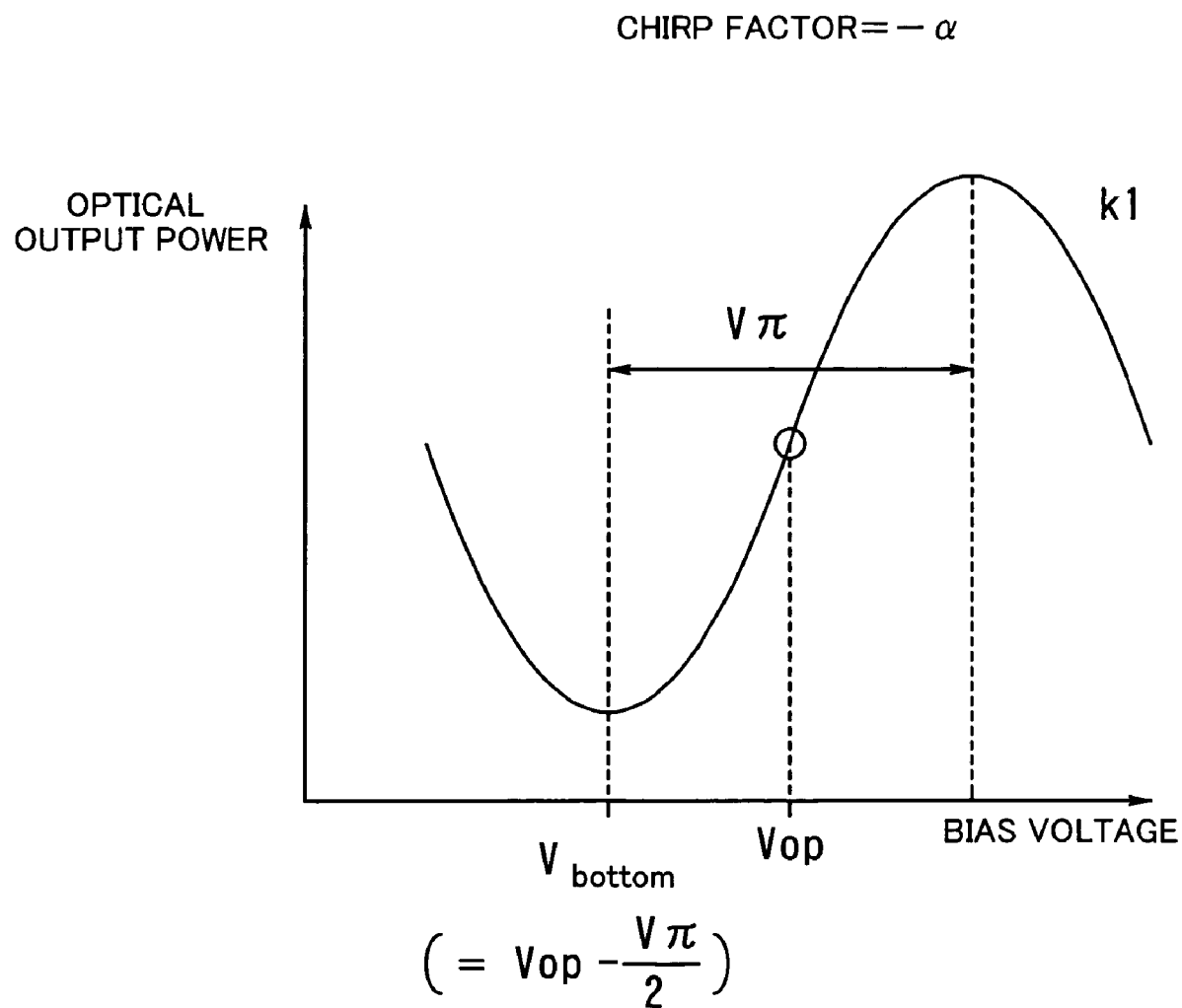
FIG. 9 shows the position of a bottom voltage determined by a chirp characteristic.
Figure 10:
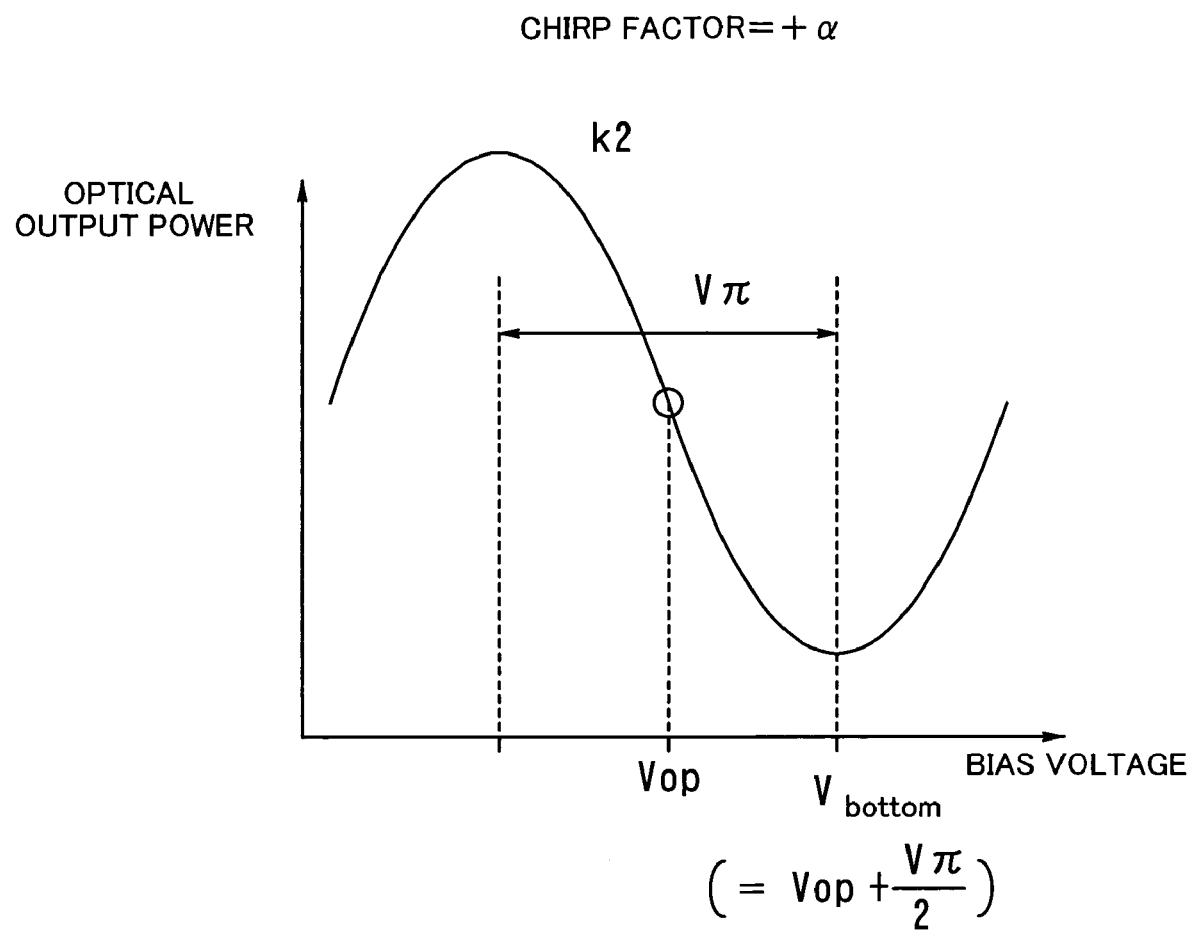
FIG. 10 also shows the position of the bottom voltage determined by the chirp characteristic.

FIGS. 9 and 10 each show the position of the bottom voltage determined by the chirp characteristic. When a chirp factor, which is a parameter indicative of the chirp characteristic of the MZ modulator 2, is −α as shown in FIG. 9, the MZ modulator 2 shows an operation characteristic curve k1 as illustrated. In this case, the bottom voltage Vbottom is calculated according to: Vbottom=Vop−Vπ/2.

On the other hand, when the chirp factor as a parameter indicative of the chirp characteristic of the MZ modulator 2 is +α as shown in FIG. 10, the MZ modulator 2 shows an operation characteristic curve k2 as illustrated, and in this case, the bottom voltage Vbottom is calculated according to: Vbottom=Vop+Vπ/2. Since the chirp factor of the MZ modulator 2 is a fixed value, the sign "+" or "−" in the equation for calculating the bottom voltage is selected beforehand in accordance with the type of the MZ modulator 2 to be used so that the CPU 43 can use the selected sign.

Figure 11:
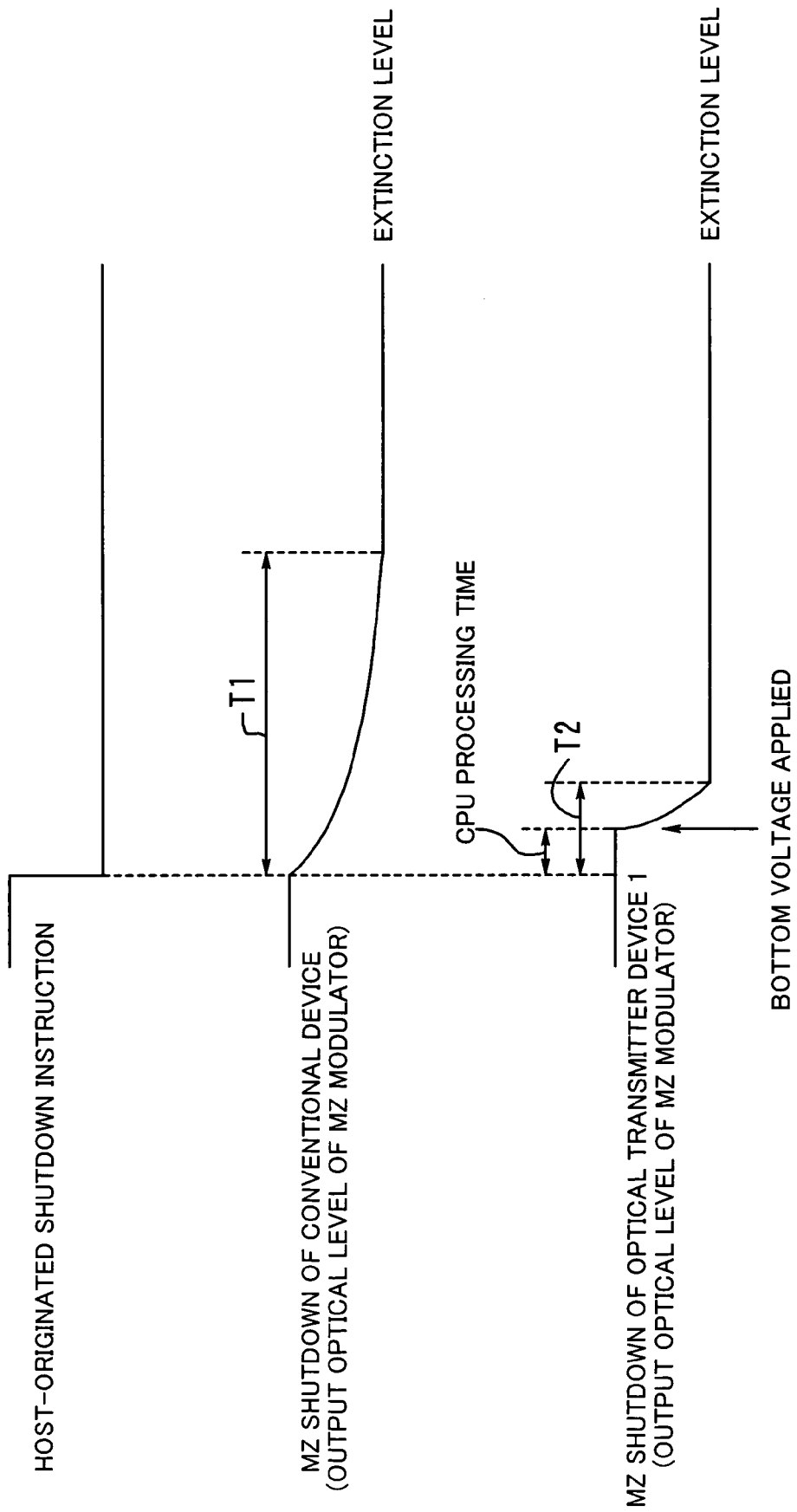
FIG. 11 is a timing chart showing MZ shutdown timing.

The effect of the shutdown control will be now explained. FIG. 11 is a timing chart illustrating the MZ shutdown timing. In the conventional device, a time T1 is required after the host-originated shutdown signal is enabled until the MZ shutdown is completed (until the output of the MZ modulator drops to the extinction level) since the operating voltage of the MZ modulator slowly lowers to the bottom voltage because of the loop control.

In the optical transmitter device 1, on the other hand, the bottom voltage calculated by the CPU 43 is immediately applied to the MZ modulator 2. Accordingly, the time required after the host-originated shutdown signal is enabled until the MZ shutdown is completed is equal to a time T2 which is the sum of the processing time necessary for the CPU 43 to calculate the bottom voltage and the time from the application of the bottom voltage to the extinction of the MZ modulator 2. The shutdown can therefore be completed much faster than is performed by the conventional shutdown control.

Figure 12:
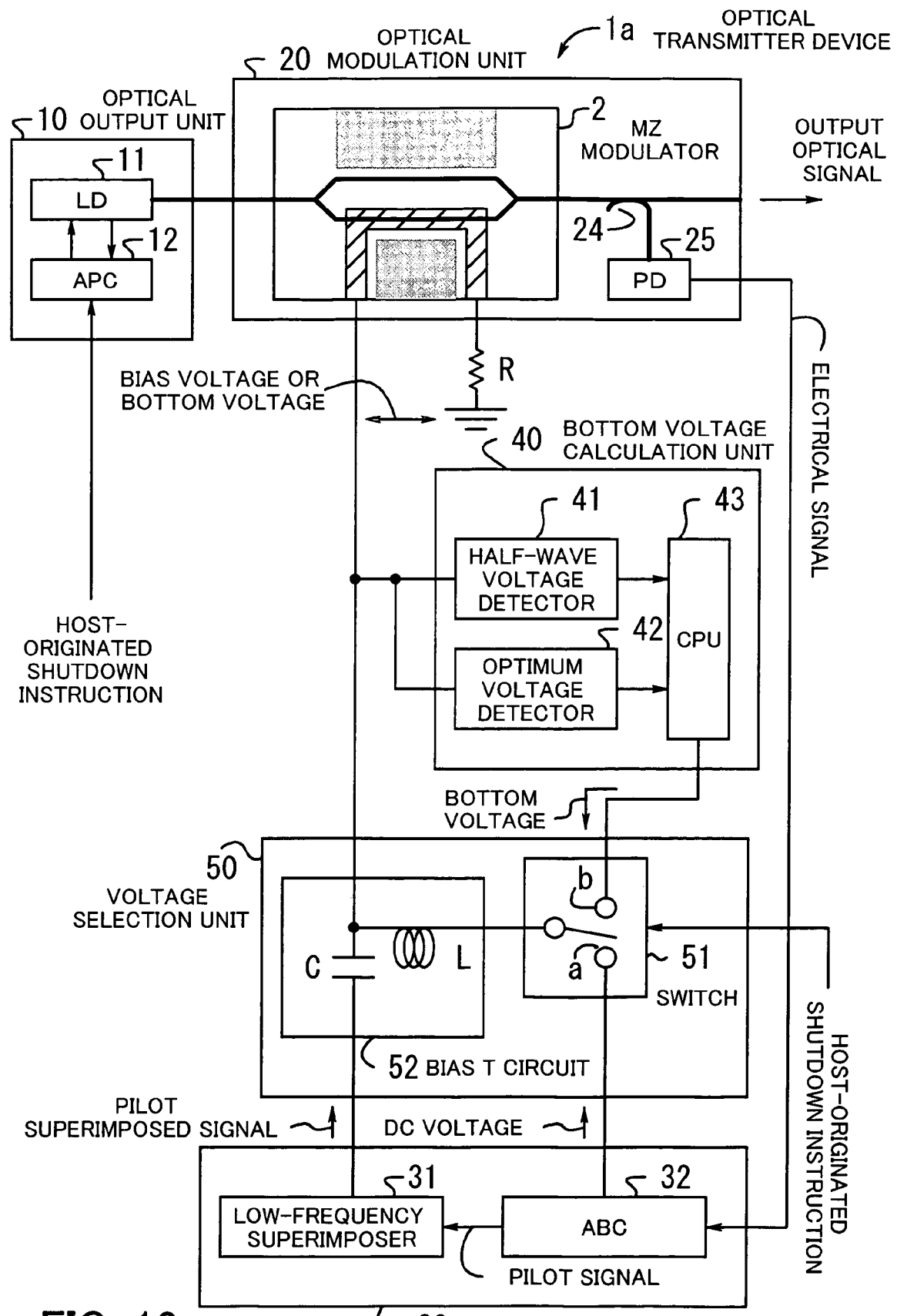
FIG. 12 shows the configuration of another optical transmitter device.

The following describes the case where the MZ shutdown and the LD shutdown are executed at the same time. FIG. 12 shows the configuration of another optical transmitter device. This optical transmitter device 1*a* has basic elements identical with those of the aforementioned optical transmitter device 1 of FIG. 2 and differs therefrom in that the host-originated shutdown instruction is input to the switch 51 and the APC 12.

Figure 13:
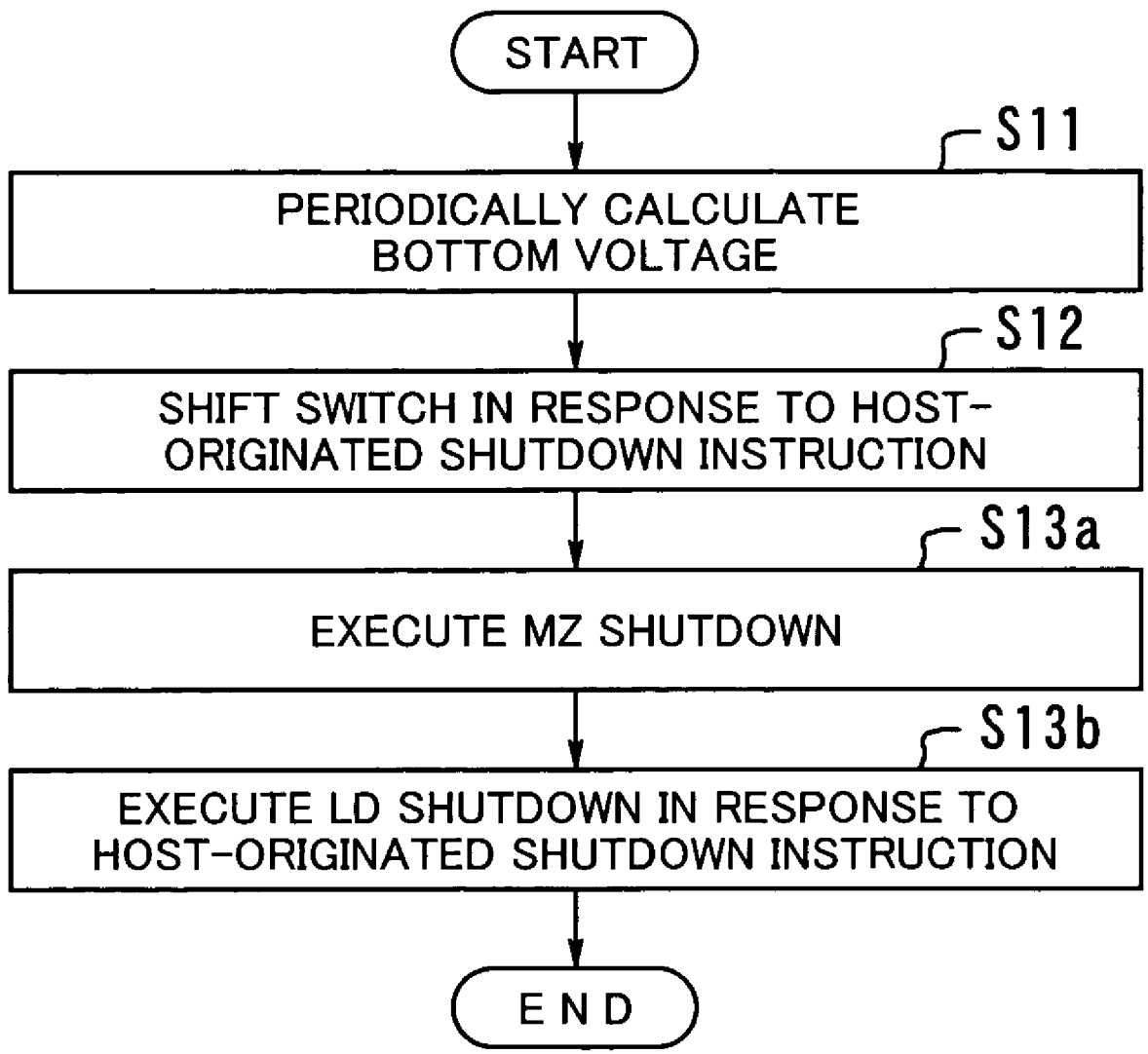
FIG. 13 is a flowchart illustrating an operation procedure for shutdown control.

FIG. 13 is a flowchart illustrating an operation procedure for shutdown control whereby the MZ shutdown and LD shutdown of the optical transmitter device 1*a* are simultaneously carried out.

[S11] The CPU 43 periodically calculates the bottom voltage from the half-wave voltage Vπ and optimum voltage Vop supplied thereto at regular intervals of time (in the optical transmitter device 1 of FIG. 2, the CPU 43 calculates the bottom voltage after receiving the host-originated shutdown instruction, but in the optical transmitter device 1*a* of FIG. 12, the CPU 43 periodically calculates the bottom voltage and previously applies the calculated bottom voltage to the terminal b of the switch 51).

[S12] On receiving a host-originated shutdown instruction, the switch 51 shifts its switch terminal from the terminal a to the terminal b.

[S13*a*] The bottom voltage is applied to the MZ modulator 2 via the bias T circuit 52, whereby the MZ modulator 2 shuts down.

[S13*b*] On receiving the host-originated shutdown instruction, the APC 12 decreases the driving current supplied to the LD 11 to shut down the LD 11. The above control permits the MZ shutdown and the LD shutdown to be performed at the same time.

Figure 14:
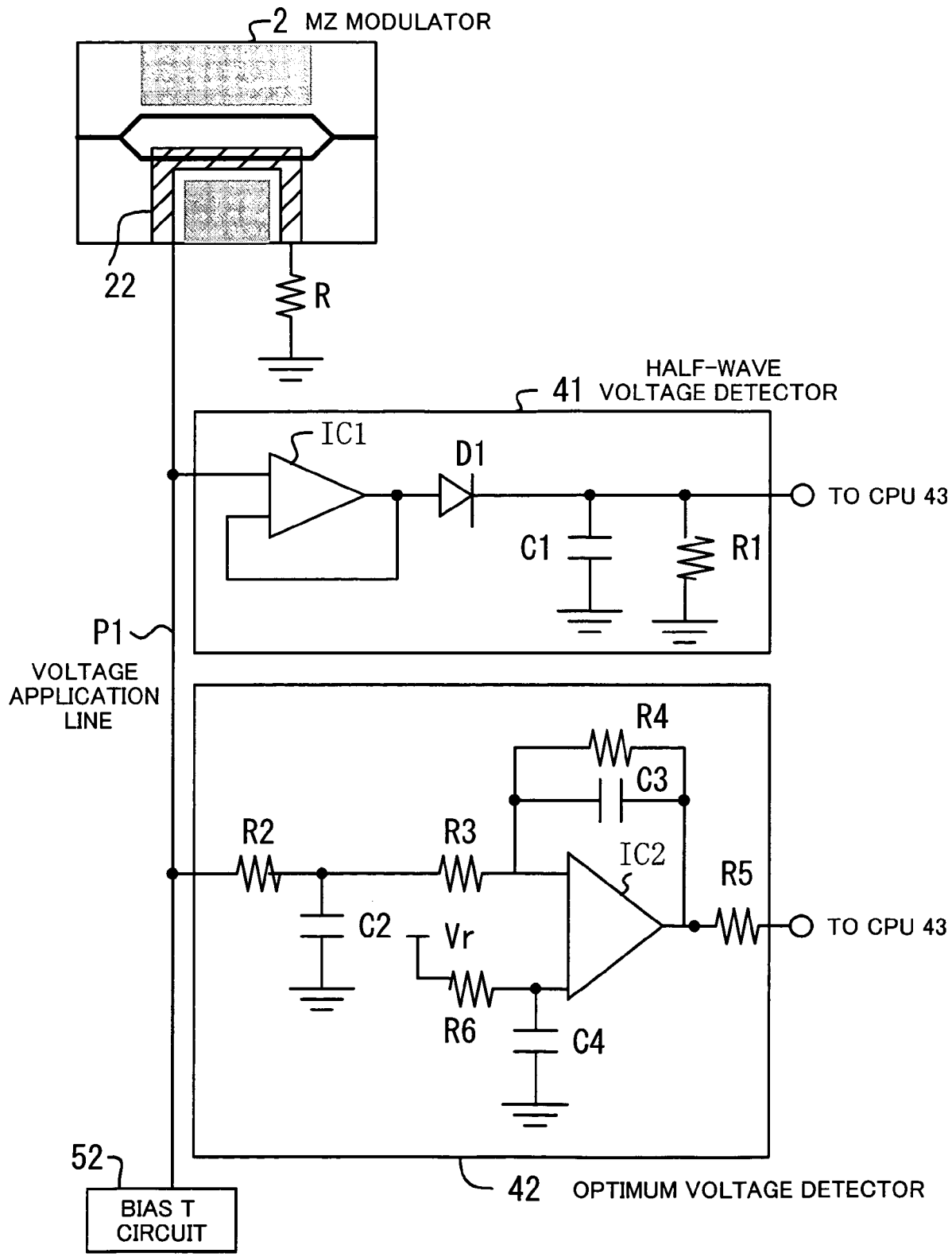
FIG. 14 exemplifies the circuit configuration of a half-wave voltage detector and optimum voltage detector.

The following describes the circuit configurations of the half-wave voltage detector 41 and optimum voltage detector 42 and the connections of the detectors with their associated elements. FIG. 14 exemplifies the circuit configurations of the half-wave voltage detector 41 and optimum voltage detector 42. The half-wave voltage detector 41 has internal elements connected in the manner described below. A buffer IC1 has one input terminal connected to a voltage application line P1, and has an output terminal connected to the anode of a diode D1 and the other input terminal thereof. The cathode of the diode D1 is connected to one end of a capacitor C1, one end of a resistor R1, and the CPU 43. The other ends of the capacitor C1 and resistor R1 are connected to GND.

The optimum voltage detector 42 has internal elements connected in the manner described below. A resistor R2 has one end connected to the voltage application line P1, and has the other end connected to one end of a capacitor C2 and one end of a resistor R3. The other end of the resistor R3 is connected to one input terminal of an operational amplifier IC2, one end of a resistor R4, and one end of a capacitor C3. The operational amplifier IC2 has an output terminal connected to the other ends of the resistor R4 and capacitor C3 and one end of a resistor R5.

A resistor R6 has one end connected to a reference voltage Vr, and has the other end connected to the other input terminal of the operational amplifier IC2 and one end of a capacitor C4. The other end of the resistor R5 is connected to the CPU 43, and the other ends of the capacitors C2 and C4 are connected to GND.

The signal electrode 22 of the MZ modulator 2 has one end connected to the voltage application line P1 extending from the bias T circuit 52, and the half-wave voltage detector 41 and the optimum voltage detector 42 are connected to the voltage application line P1 as branches thereof. The other end of the signal electrode 22 is terminated by a resistor R.

The voltage application line P1 passes therethrough the pilot superimposed signal containing an input data signal with a rate of 10 Gb/s or higher, for example. Since the voltage detection lines of the half-wave voltage detector 41 and optimum voltage detector 42 are connected to the voltage application line P1, there is a possibility that the pilot superimposed signal will undergo waveform distortion or amplitude fluctuation.

It is therefore necessary that signal patterns appearing in the vicinity of the voltage application line P1 should be optimized in advance by using a simulation tool, to ensure that the loss of frequency characteristic and the impedances fall within respective allowable ranges.

The optical transmitter device 1*a* is configured following preliminary steps such as the simulation of package design and the optimization of signal patterns through actual measurement, such that the node between the voltage application line P1 and the input terminal of the buffer IC1 and the node between the line P1 and the input terminal of the operational amplifier IC2 individually have high impedance, to eliminate adverse influence upon the pilot superimposed signal so that interference-induced deterioration may fall within an allowable range, thereby preventing waveform distortion and amplitude fluctuation.

In the optical transmitter device 1*a* described above, the bottom voltage for the MZ modulator 2 is previously calculated and applied directly to the MZ modulator 2, whereby high-speed shutdown can be carried out, unlike the conventional device associated with a delay attributable to the filter time constant.

In the above description, the bottom voltage is calculated after the half-wave voltage Vπ and the optimum voltage Vop are detected by the respective detectors. As for the half-wave voltage Vπ, however, the voltage Vπ may be measured in advance at the time of adjusting the device and the measured value may be stored in memory in the CPU 43. In this case, the bottom voltage is calculated using the optimum voltage Vop detected by the optimum voltage detector 42 and the stored half-wave voltage Vπ. Since the half-wave voltage detector 41 is unnecessary, the circuitry can be reduced in scale.

Figure 15:
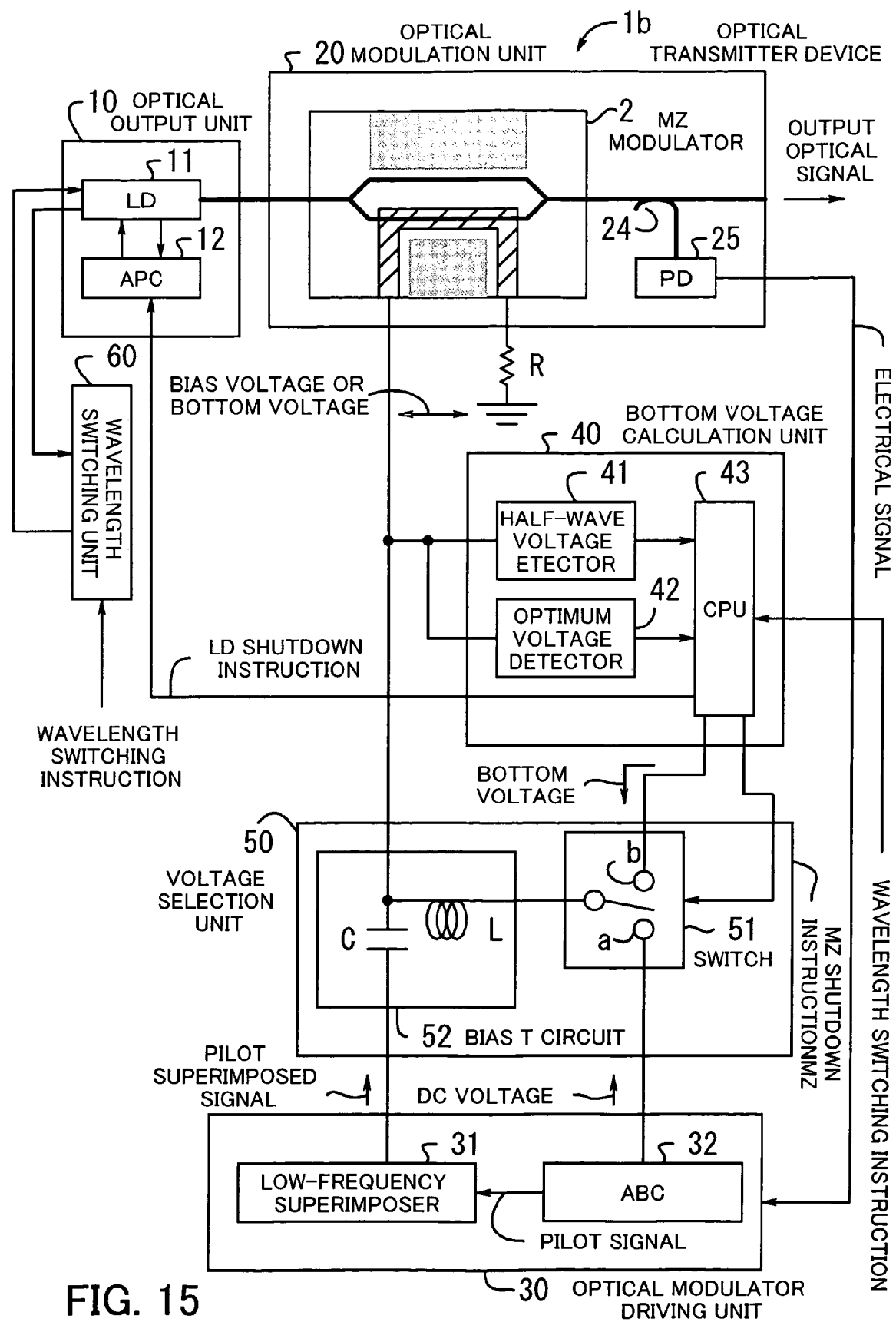
FIG. 15 shows the configuration of still another optical transmitter device.

An optical transmitter device having a wavelength switching unit will be now described with reference to FIG. 15 showing a configuration thereof. Basic elements of this optical transmitter device 1*b* are identical with those of the aforementioned optical transmitter device 1 of FIG. 2. The two devices differ from each other in that the optical transmitter device 1*b* has a wavelength switching unit 60 and that a wavelength switching instruction is sent from the host and supplied to the CPU 43 and the wavelength switching unit 60.

Figure 16:
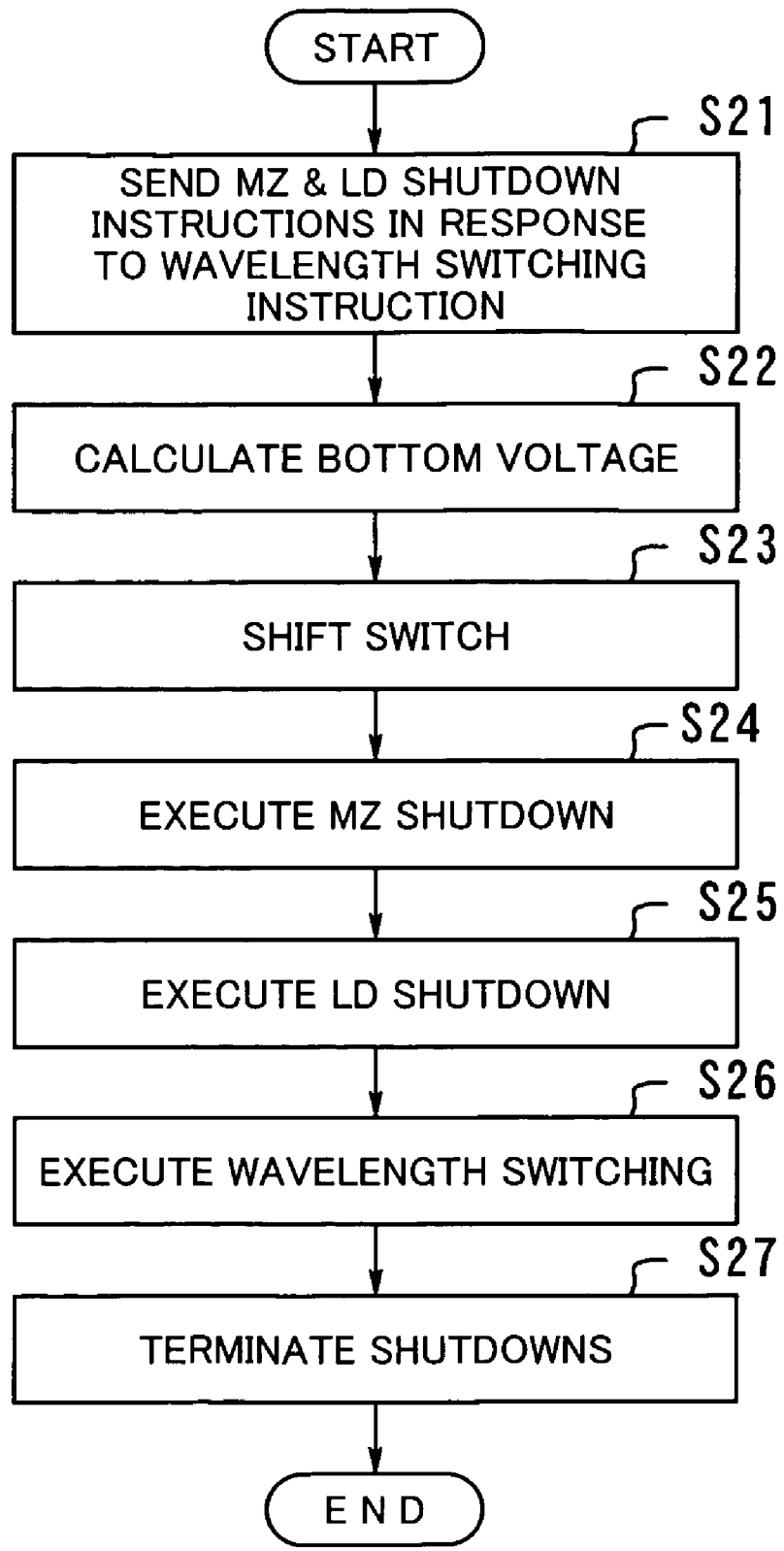
FIG. 16 is a flowchart illustrating an operation procedure for shutdown control.

FIG. 16 is a flowchart illustrating an operation procedure for shutdown control wherein the optical transmitter device 1*b* executes the MZ shutdown and the lD shutdown on receiving the wavelength switching instruction.

[S21] On receiving a wavelength switching instruction, the CPU 43 generates an MZ shutdown instruction and sends the generated instruction to the switch 51. In addition, the CPU 43 generates an LD shutdown instruction and sends the generated instruction to the APC 12.

[S22] The CPU 43 fetches the half-wave voltage Vπ detected by the half-wave voltage detector 41 and the optimum voltage Vop detected by the optimum voltage detector 42, and calculates the bottom voltage.

[S23] On receiving the MZ shutdown instruction, the switch 51 shifts its switch terminal from the terminal a to the terminal b.

[S24] The bottom voltage is applied to the MZ modulator 2 via the bias T circuit 52, so that the MZ modulator 2 shuts down.

[S25] On receiving the LD shutdown instruction, the APC 12 decreases the driving current supplied to the LD 11, thereby shutting down the LD 11.

[S26] The wavelength switching unit 60 causes the LD 11 to switch wavelengths after a delay of a fixed time from the reception of the wavelength switching instruction (the time required for completing the MZ and LD shutdowns is set in advance so that the wavelength switching may take place after the completion of the MZ and LD shutdowns).

[S27] After the wavelength switching is completed, the CPU 43 terminates the MZ and LD shutdowns.

Figure 17:
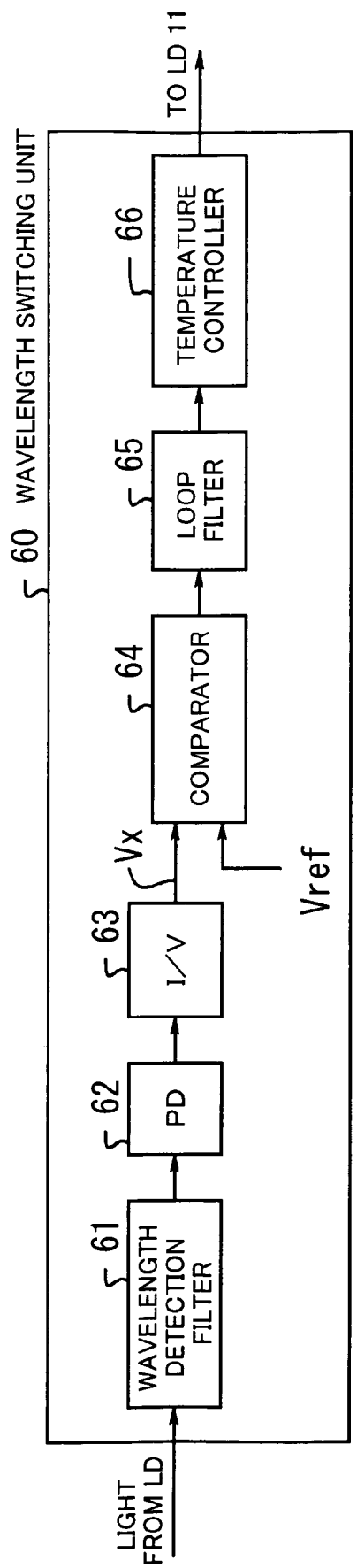
FIG. 17 shows the configuration of a wavelength switching unit.

The wavelength switching unit 60 will be now described. FIG. 17 shows the configuration of the wavelength switching unit 60. The wavelength switching unit 60 includes a wavelength detection filter 61, a PD 62, an I/V converter 63, a comparator 64, a loop filter 65, and a temperature controller 66.

The wavelength detection filter 61 is an optical filter whose transmittance varies with wavelength, and filters the light (backward light) output from the LD 11. The PD 62 receives the light transmitted through the wavelength detection filter 61 and converts the received light to electric current. The I/V converter 63 converts the current to a voltage Vx. The comparator 64 compares the voltage Vx from the I/V converter 63 with a reference voltage Vref and outputs a signal corresponding to a difference between these voltages.

The loop filter 65 smoothes the output signal of the comparator 64. The temperature controller 66 receives the signal output from the loop filter 65 and controls the temperature of the LD 11 such that the output voltage Vx and the reference voltage Vref become equal to each other.

Figure 18:
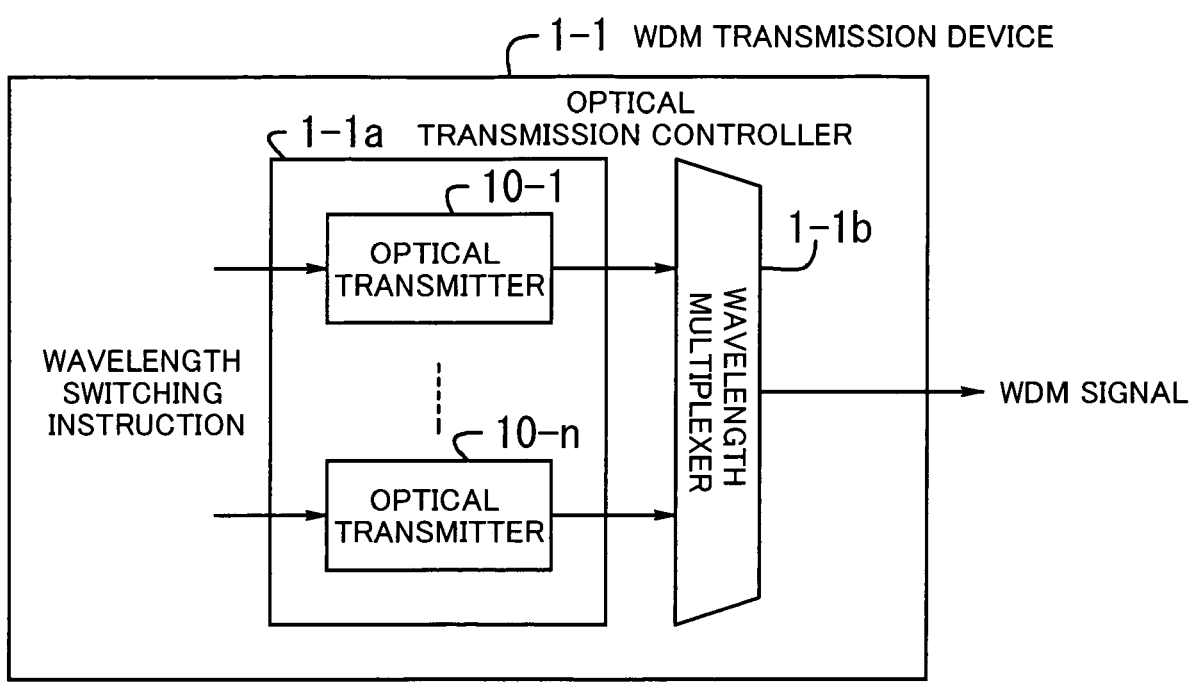
FIG. 18 shows the configuration of a WDM transmission device.
Figure 19:
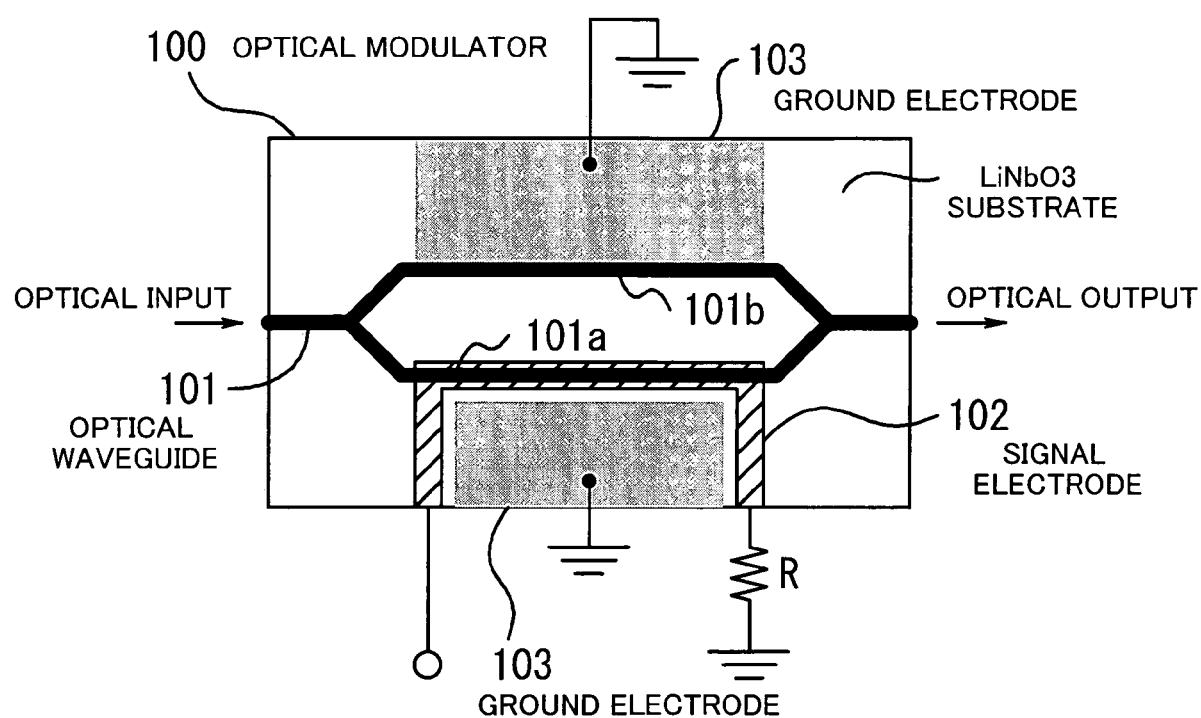
FIG. 19 shows the configuration of an optical modulator.
Figure 20:
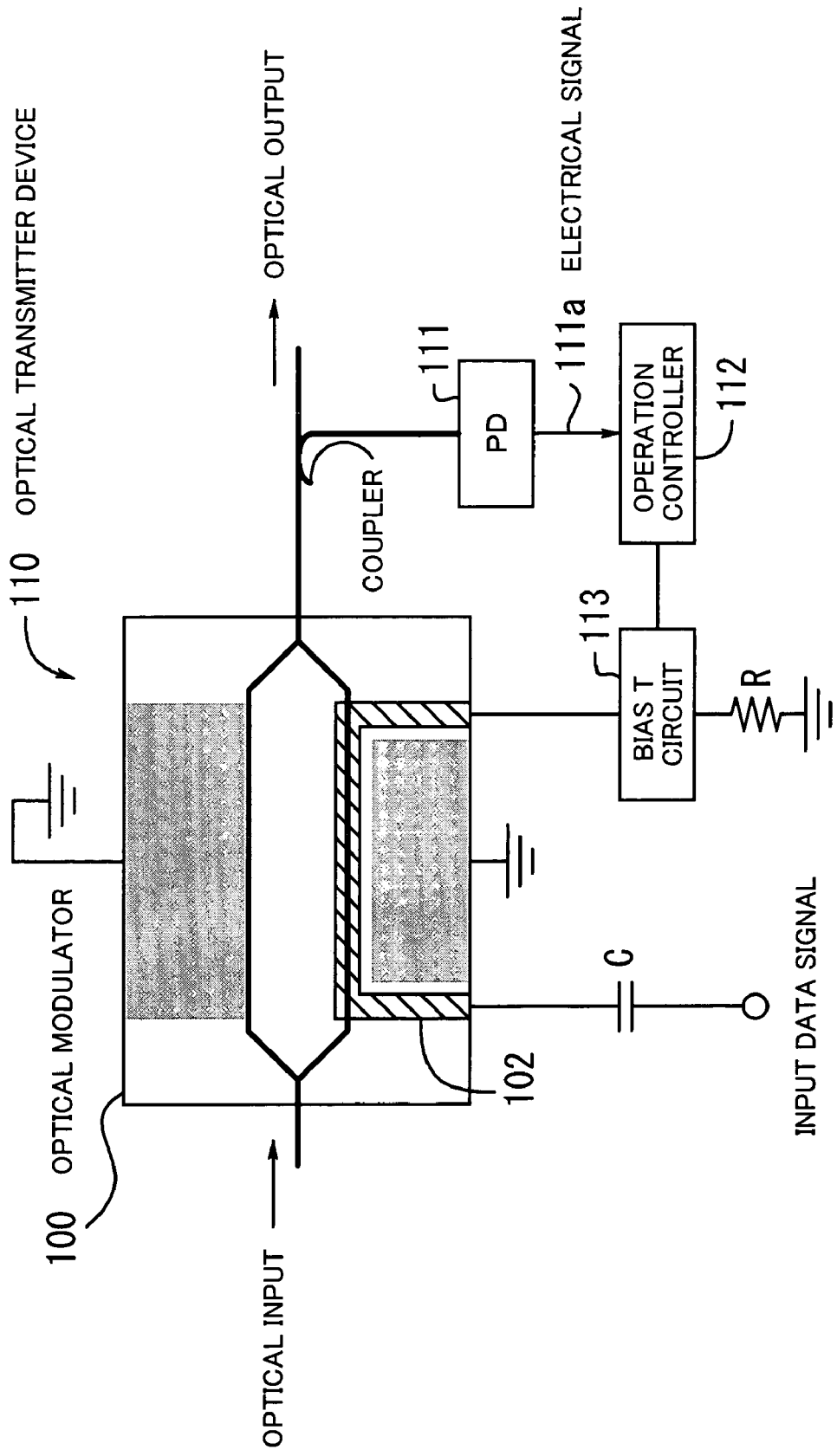
FIG. 20 shows the configuration of a conventional optical transmitter device including the optical modulator.

A WDM transmission device to which the optical transmitter device 1 is applied will be now described with reference to FIG. 18 showing a configuration thereof. The WDM transmission device 1-1 comprises an optical transmission controller 1-1a and a wavelength multiplexer 1-1b. The optical transmission controller 1-1a includes optical transmitters 10-1 to 10-n (each corresponding to the optical transmitter device described above with reference to the drawings).

On receiving a wavelength switching instruction, each of the optical transmitters 10-1 to 10-n shuts down the MZ modulator and the LD incorporated therein at high speed and switches the wavelength to a predetermined wavelength. The wavelength multiplexer 1-1b receives the optical signals of different wavelengths from the respective optical transmitters 10-1 to 10-n and multiplexes the optical signals to generate a WDM signal, which is then output.

The optical transmitter device of the present invention detects drift of the operation characteristic curve of the optical modulator and controls the bias voltage applied to the optical modulator such that the operating point of the optical modulator is situated at a fixed position with respect to the operation characteristic curve. The bottom voltage calculation unit calculates the bottom voltage of the operation characteristic curve from the half-wave voltage of the operation characteristic curve and the bias voltage, and the output of the optical modulator is restrained in accordance with the output from the bottom voltage calculation unit. This makes it possible to restrain the output of the optical modulator at high speed, thus enabling high-speed wavelength switching.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmitter device comprising:
    a light source (LD);
    a driver circuit for generating a driving voltage corresponding to an input signal;
    a Mach-Zehnder (MZ) optical modulator for modulating output light from said light source in accordance with the driving voltage and outputting the modulated light as an optical signal;
    an operating point stabilizing circuit for detecting drift of an operation characteristic curve of said MZ optical modulator and controlling a bias voltage applied to said MZ optical modulator such that an operating point of said MZ optical modulator is situated at a fixed position with respect to the operation characteristic curve;
    a bottom voltage calculation unit for calculating periodically a bottom voltage of the operation characteristic curve from a half-wave voltage of the operation characteristic curve and the bias voltage; and
    wherein the bottom voltage calculation unit generates and sends a shutdown instruction for said LD and shuts down the output light of said LD in response to a shutdown instruction signal from an external source;
    a switch for forcing said MZ optical modulator to be driven at the bottom voltage calculated by said bottom voltage calculator and shutting down the output of the optical signal in response to the shutdown instruction signal from an external source.

2. The optical transmitter device according to claim 1, wherein the output of the optical signal is shut down by first activating said switch and then shutting down the output of said light source.

3. The optical transmitter device according to claim 1, wherein the output of the optical signal is shut down by activating said switch simultaneously with shutting down the output of said light source.

4. The optical transmitter device according to claim 1, wherein a wavelength of the output light of said light source is changed by first restraining the output of said MZ optical modulator in accordance with the output from said bottom voltage calculation unit and then changing the wavelength of the output light.

5. The optical transmitter device according to claim 1, wherein said bottom voltage calculation unit detects the half-wave voltage and an optimum bias voltage of said MZ optical modulator, and calculates the bottom voltage from the half-wave voltage detected during normal operation and the optimum bias voltage.

6. The optical transmitter device according to claim 1, wherein said bottom voltage calculation unit stores a half-wave voltage measured during adjustment of said optical transmitter device, and calculates the bottom voltage from the stored half-wave voltage and an optimum bias voltage detected during normal operation of said MZ optical modulator.

7. An optical transmitter device comprising:
- a light source (LD);
- a driver circuit for generating a driving voltage corresponding to an input signal;
- a Mach-Zehnder (MZ) optical modulator for modulating output light from said light source in accordance wit the driving voltage and outputting the modulated light as an optical signal;
- an operating point stabilizing circuit for detecting drift of an operation characteristic curve of said MZ optical modulator and controlling a bias voltage applied to said MZ optical modulator such that an operating point of said MZ optical modulator is situated at a fixed position with respect to the operation characteristic curve;
- a bottom voltage calculation unit for calculating periodically a bottom voltage of the operation characteristic curve from a half-wave voltage of the operation characteristic curve and the bias voltage;
- wherein the bottom voltage calculation unit generates and sends a shutdown instruction for said LD and shuts down the output light of said LD in response to a wavelength switching instruction signal from an external source;
- a switch for forcing said MZ optical modulator to be driven at the bottom voltage calculated by said bottom voltage calculator and shutting down the output of the optical signal in response to the wavelength switching instruction signal; and
- a wavelength switching unit for causing said LD to switch wavelengths after completing the shutdowns of said MZ and said LD in response to the wavelength switching instruction signal.

* * * * *

UNITED STATES PATENT AND TRADEMARK OFFICE
CERTIFICATE OF CORRECTION

| | | |
|---|---|---|
| PATENT NO. | : 7,215,894 B2 | Page 1 of 1 |
| APPLICATION NO. | : 11/044181 | |
| DATED | : May 8, 2007 | |
| INVENTOR(S) | : Yuka Kobayashi et al. | |

It is certified that error appears in the above-identified patent and that said Letters Patent is hereby corrected as shown below:

Column 13, Line 6, change "wit" to --with--.

Signed and Sealed this

Sixteenth Day of October, 2007

JON W. DUDAS
*Director of the United States Patent and Trademark Office*

UNITED STATES PATENT AND TRADEMARK OFFICE
Certificate

Patented: May 8, 2007

Patent No. 7,215,894 B2

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yuka Kobayashi, Kawasaki (JP); Tetsuya Kiyonaga, Kawasaki (JP); Yasunori Nagakubo, Kawasaki (JP); Hidehiko Narusawa, Kawasaki (JP); and Kensuke Matsui, Yokohama (JP).

Signed and Sealed this Fourteenth Day of July 2009.

Jason Chan
*Supervisory Patent Examiner*
Art Unit 2613